(12) United States Patent
Ishikawa et al.

(10) Patent No.: US 6,614,518 B1
(45) Date of Patent: Sep. 2, 2003

(54) MULTI-POINT LIGHT MEASURING SYSTEM

(75) Inventors: Norio Ishikawa, Osaka (JP); Norihisa Hosoi, Toyokawa (JP); Susumu Shirai, Toyohashi (JP); Michio Nishio, Kani (JP); Ryuji Tsuji, Gifu-Ken (JP); Tomoya Kimata, Toki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/480,181

(22) Filed: Jan. 11, 2000

(30) Foreign Application Priority Data

Jan. 14, 1999 (JP) .......................................... 11-007939

(51) Int. Cl.⁷ .................................................. G01J 1/42
(52) U.S. Cl. ........................ 356/218; 356/215; 356/222
(58) Field of Search ................................. 356/218, 215, 356/221, 213

(56) References Cited

U.S. PATENT DOCUMENTS

| | | |
|---|---|---|
| 4,909,633 A | 3/1990 | Okui et al. |
| 5,345,305 A | 9/1994 | Chen |
| 5,589,934 A | 12/1996 | Hosoi et al. |
| 5,920,392 A * | 7/1999 | Tsai et al. .................... 356/358 |
| 6,097,288 A * | 8/2000 | Koeppe, Jr. .................. 340/517 |

* cited by examiner

Primary Examiner—Frank G. Font
Assistant Examiner—Layla Lauchman
(74) Attorney, Agent, or Firm—Burns, Doane, Swecker & Mathis, LLP

(57) ABSTRACT

A multi-point light measuring system for sensing an optical characteristic such as illuminance at a plurality of measurement points with respect to the same illumination is configured by a single main unit, a plurality of light measuring units and a plurality of adapters for data communication. At least one light measuring unit and the main unit are connected by wired or wireless adapters, and each adjoining two light measuring units is connected by wired adapters. A controller of the main unit controls the light measuring units by commands transmitted by the adapters for obtaining light measuring data from the light measuring units and displays a measurement result on a display of the main unit.

21 Claims, 23 Drawing Sheets

| S T X | DISCRIMINATION NUMBER M | COMMAND NUMBER | BELONGING DATA "D" | E T X | B C C |
|---|---|---|---|---|---|

MULTI-POINT LIGHT MEASURING SYSTEM

This application is based on patent application Hei. 11-7939 filed in Japan, the content of which are hereby incorporated by references.

BACKGROUND OF THE INVENTION

1. Field of the Invention

This invention relates to a multi-point light measuring system including a plurality of light measuring units which can be disposed at different points for sensing optical characteristics at the different points at the same time.

2. Description of the Related Art

For example, in a performance evaluation of a projector, optical characteristics such as illuminance distribution and color distribution on a screen are measured. Furthermore, time-variation of the optical characteristic is measured for evaluating stability of a light source of the projector. On the other hand, in the art of architectural illumination, an effect of illumination is evaluated by measuring illuminance distribution in an illumination area. Furthermore, an effect of day light at the window side is evaluated by measuring time-valuation of the illuminance distribution.

In the conventional measurement of the illuminance distribution or the color distribution, a single light measuring apparatus such as an illuminance meter or a colorimeter is serially moved to a plurality of measurement points for measuring the illuminance or the color at each measurement point (repeating one-point measurement). Alternatively, a plurality of light measuring apparatuses are respectively disposed at a plurality of measurement points for measuring the illuminance or the color at each measurement point at the same time (method of multi-point measurement).

A light measuring apparatus such a illuminance meter and a colorimeter, in which a light measuring unit for receiving light rays is detachable from a main unit with a control circuit for controlling the light measuring operation and a display for displaying measurement data, is conventionally known and merchandized. By connecting the light measuring unit and the main unit by a dedicated cable, optical characteristics such as the illuminance and the color at a measurement point can be measured at a point distant from the measurement point.

Furthermore, a light measuring apparatus having output terminals for outputting measurement data to, for example, a personal computer for realizing a multi-point measurement is conventionally known and merchandized. In such a multi-point measurement system, the output terminals of a plurality of the light measuring apparatuses are connected by a generalized bus line such as GPIB (General Purpose Interface Bus) or a dedicated bus line to the personal computer serving as a data processing apparatus for transmitting the measurement data. The personal computer processes the measurement data from the measurement points transmitted through the bus line.

In the measurement of the optical characteristics such as the illuminance and the color, the multi-point measurement is suitable with regard to the quickness, the easiness and the concurrence (the same condition) of the measurement. However, the conventional light measuring apparatus in which the light measuring unit is detachable from the main unit cannot be used in the multi-point measurement, since only one light measuring unit can be connected to the main unit. In other words, it is impossible to connect a plurality of light measuring units by a cascade line connection to the main unit. Thus, a plurality of independent light measuring apparatuses are disposed at respective measurement points, and the light measuring apparatuses are connected to the personal computer by the bus line. The system will be complex and expensive.

SUMMARY OF THE INVENTION

An object of the present invention is to provide a multi-point light measuring system including a single main unit and a plurality of light measuring units connected by a cascade line connection.

A multi-point light measuring system in accordance with the present invention comprises: a plurality of light measuring units for receiving incident light and for obtaining data with respect to the incident light; a single main unit including a controller for controlling light measuring operation and a display; a plurality of first interface units respectively provided on the light measuring units and adjoining two first interface units are connected each other by a communication cable; a second interface unit provided on the main unit. The controller collects the data from at least one light measuring unit via the first and second interface units and the communication cable. The display displays a value of an optical characteristic based on the collected data.

By such a configuration, the data of an optical characteristic such as illuminance, color, color temperature, and so on at a plurality of measurement points can be obtained at the same time by the light measuring units which are connected by a cascade line connection of the first interface units. The multi-point light measuring system in accordance with the present invention is configured by a plurality of light measuring units and a single main unit, so that the system can be simplified and inexpensive.

DETAILED DESCRIPTION OF THE EMBODIMENT

An embodiment of a multi-point light measuring system in accordance with the present invention is described below by taking a multi-point illuminance measurement as an example. The present invention is not restricted by the measurement of illuminance. It is possible to apply a multi-point measurement using an infrared intensimeter, an ultraviolet intensimeter, a light power meter, a colorimeter, a flash meter, an exposure meter, a color temperature meter, and so on. In the following description, the term "measurement data" mainly relates to a quantity of light. It, however, can include a chromaticity with respect to the color of the object, a color temperature with respect the temperature of an object, and so on.

Figure 1:
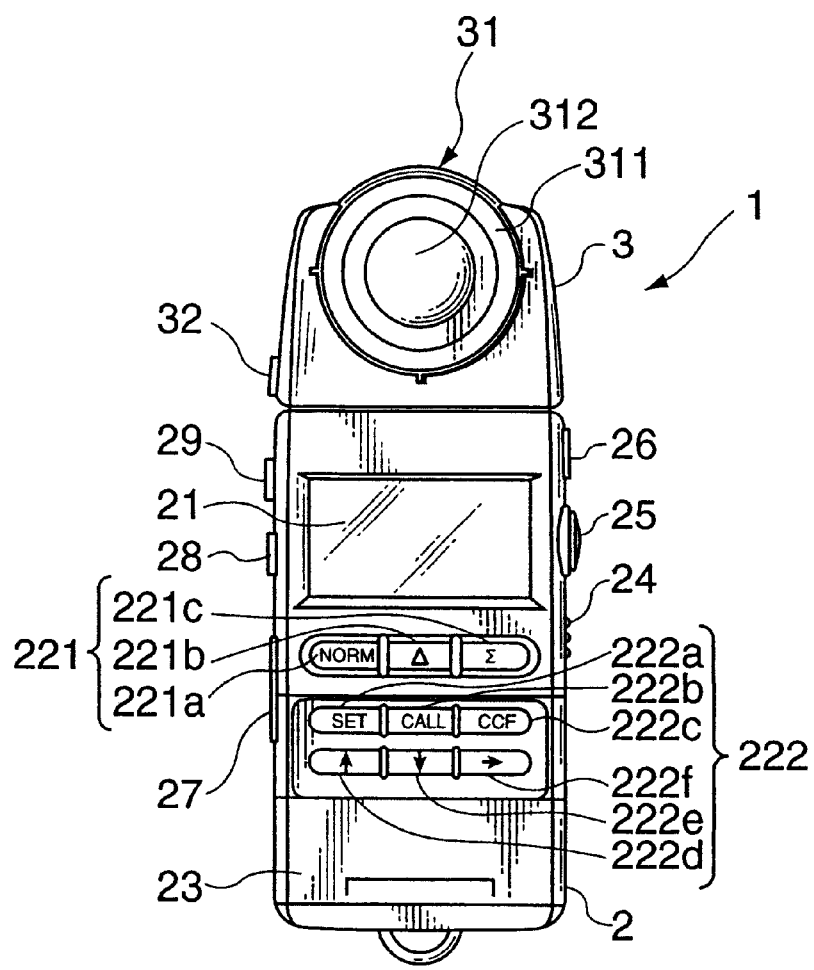
FIG. 1 is a front view showing an illuminance meter applicable of an embodiment of a multi-point light measuring system in accordance with this invention.
Figure 2:
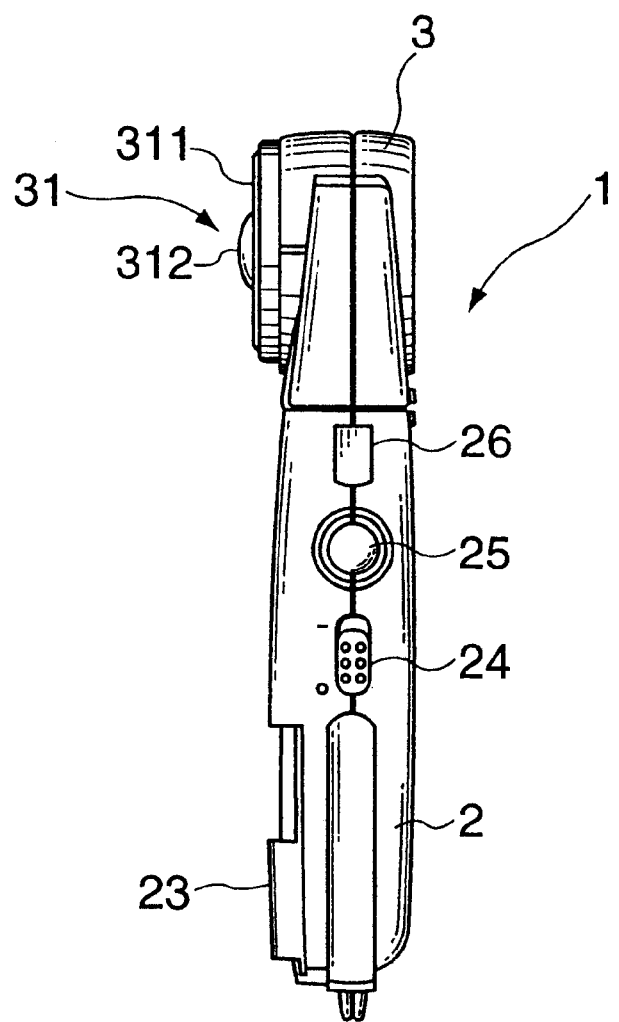
FIG. 2 is a side view of the illuminance meter.
Figure 3:
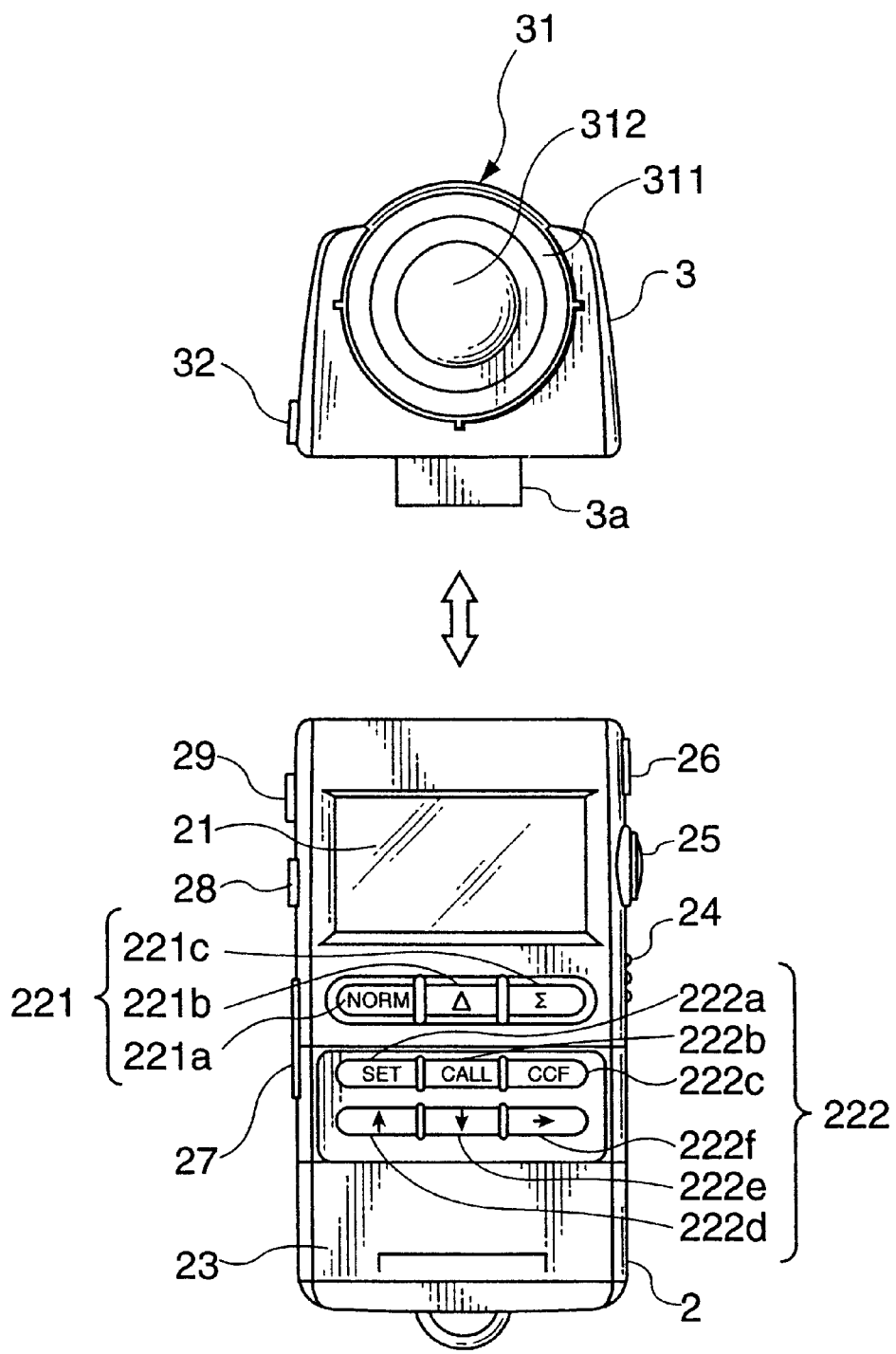
FIG. 3 is a front view of the illuminance meter in which a light measuring unit is detached from a main unit.

FIG. 1 shows a front view of an illuminance meter used in an embodiment of the multi-point light measuring system in accordance with the present invention. FIG. 2 shows a right side view of the illuminance meter. FIG. 3 shows a front view of the illuminance meter in which a light measuring unit is detached from a main unit.

As can be seen from FIGS. 1 to 3, the illuminance meter 1 is configured by a main unit 2 and a light measuring unit 3. The light measuring unit 3 is detachable from a top end of the main unit 2. A male connector 3a is provided substantially at the center on a bottom face of the light measuring unit 3. Similarly, a female connector 2a (see FIG. 4) is provided at substantially at the center on the top end of the main unit 2. The male connector 3a comprises a plurality of male terminals (see FIG. 7), and the female connector 2a comprises a plurality of female terminals corresponding to the male terminals (not shown in the figure). When the male connector 3a is inserted into the female connector 2a, the light measuring unit 3 is coupled with the main unit 2, and the light measuring unit 3 and the main unit 2 can communicate the data via the connectors 3a and 2a.

A display panel 21 for digitally displaying measurement result and predetermined character information is provided at upper center on a front face of the main unit 2. As the display panel 21, a passive type display device such as a liquid crystal display (LCD), an electrochemical display (ECD), an electrophoresis display (EPID) can be used. Alternatively, it is possible to use an active display device such as LED (Light Emitting Diode) array and a plasma display panel.

A first group of operation switches 221 and a second group of operation switches 222 are serially disposed below the display panel 21. The illuminance meter 1 in this embodiment includes three measurement modes of "normal mode", "relative illuminance mode" and "summation illuminance mode". The first group 221 is constituted by operation switches 221a, 221b and 221c for selecting one of these three measurement modes.

When the operation switch 221a (hereinafter called "normal operation switch") is switched on, the normal mode for measuring a illuminance "L" (lx) normally is selected. In the illuminance meter 1, the normal mode is initially set. In the normal mode, the illuminance meter 1, at first, executes zero-calibration by simplified zero adjustment which will be described below. After that, the illuminance meter 1 repeatingly measures the illuminance "L" at a predetermined interval, for example, one second, and the measurement results are renewably displayed on the display panel 21.

When the operation switch 221b (hereinafter called "Δ operation switch") is switched on, the relative illuminance mode is selected. In the relative illuminance mode, the illuminance meter 1 measures an illumination value "L" (lx) and calculates a relative illuminance value "ΔL" (ΔL=L−Lr) (lx) or a percentage thereof "ΔL" (ΔL=(L−Lr)·100/Lr) (%) from the measured illuminance value "L" (lx) and a standard illuminance value "Lr" which is previously inputted. The calculated result is displayed on the display panel 21. When the operation switch 221b is switched on once, the relative illuminance value "ΔL" (lx) is displayed on the display panel 21. When the operation switch 221b is switched on twice, the percentage "ΔL" (%) of the relative illuminance value "ΔL" (lx) is displayed on the display panel 21. The relative illuminance value "L" (lx) and the percentage "ΔL" (%) are alternatively displayed on the display panel 21 when the operation switch 221b is switched on.

When the operation switch 221c (hereinafter called "Σ operation switch") is switched on, the summation illuminance mode is selected. In the summation illuminance mode, the illuminance meter 1 measures the illuminance values "L" (lx) at the predetermined interval and calculates a summation illuminance value "Lsum" (Lsum=L×ΣST) (lx·h) or an average value of the illuminance "Lave" (Lave=Lsum/ΣT) (lx) by using the illuminance value "L" (lx) and a summation measurement time (hour). The calculated result is displayed on the display panel 21. When the operation switch 221c is switched on once, the summation illuminance value "Lsum" (lx·h) is displayed on the display panel 21. When the operation switch 221c is switched on twice, the summation measurement time "ΣT" (hour) is displayed on the display panel 21. When the operation switch 221c is switched on third times, the average value of the illuminance value "Lave" (lx) is displayed on the display panel 21. The summation illuminance value "Lsum" (lx·h), the summation measurement time "ΣT" (hour) and the average value of the illuminance value "Lave" (lx) are cyclically displayed on the display panel 21 when the operation switch 221c is switched on.

Figure 23:
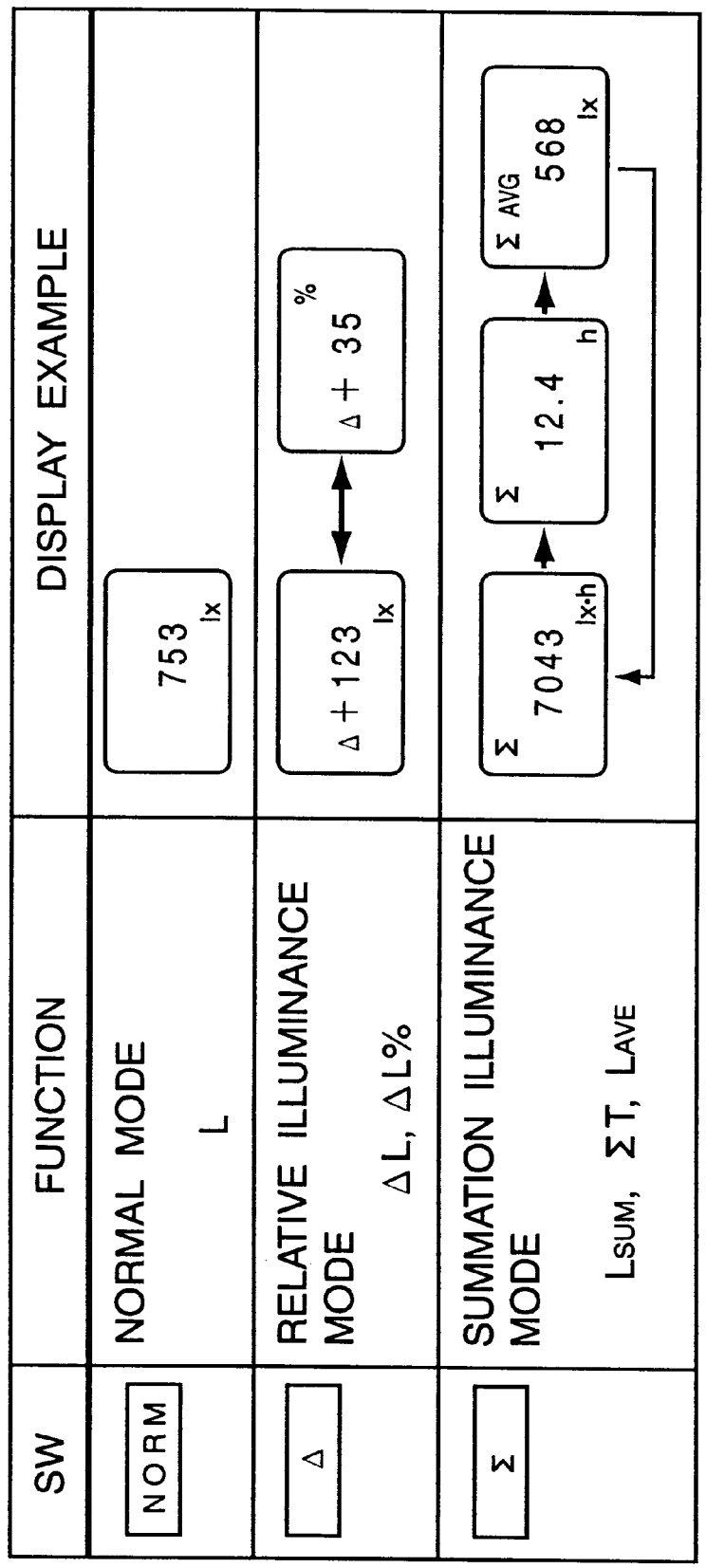
FIG. 23 is a table showing examples of display on a display panel with respect to measurement modes in the embodiment.

Examples of the display on the display panel 21 with respect to the measurement modes is shown in FIG. 23. The operation switches will be abbreviated as "SW" in the figures.

The second group 222 is constituted by operation switches 222a to 222f for switching input of data into a memory and output data from the memory. These operation switches 222a to 222f are not normally used during the measurement of illuminance, so that these operation switches 222a to 222f are covered by a sliding cover 23 so as not to be operated erroneously.

The operation switch 222a (hereinafter called "SET switch") is used for setting data such as the standard illuminance value "Lr" in the relative illuminance mode, a limit value of the summation illumination "Elim" and a limit value of summation time "Tlim". The operation switch 222b (hereinafter called "CALL switch") is used for reading the data such as the standard illuminance value "Lr" and a value of color compensation factor (CCF value) from the memory.

It is ideal that a spectral response characteristic of the illuminance meter 1 completely coincides with the standard luminous efficiency. However, an actual illuminance meter has a discrepancy (error component) from the standard luminous efficiency. When an illuminance owing to a light source having a spectral characteristic different from a standard light source is used for calibrating the illuminance meter, a measurement result of illuminance measured by the calibrated illuminance meter includes an error component. The CCF value is a compensation factor multiplied on the measurement result for compensating the error component. The CCF value is further used as a compensation factor for compensating inherent spectral characteristics of a plurality of illuminance meters. The operation switch 222c is used for switching whether the CCF value is multiplied on the measurement value or not, for setting and changing the CCF values.

The operation switch 222d (hereinafter called "up operation switch") is used for searching the data in a direction increasing the number of address when the data are inputted into the memory. The operation switch 222e (hereinafter called "down operation switch") is used for searching the data in a direction decreasing the number of address when the data are inputted into the memory. The operation switch 222f (hereinafter called "shift operation switch") is used for shifting numerical values when the data are inputted into the memory.

Figure 6:
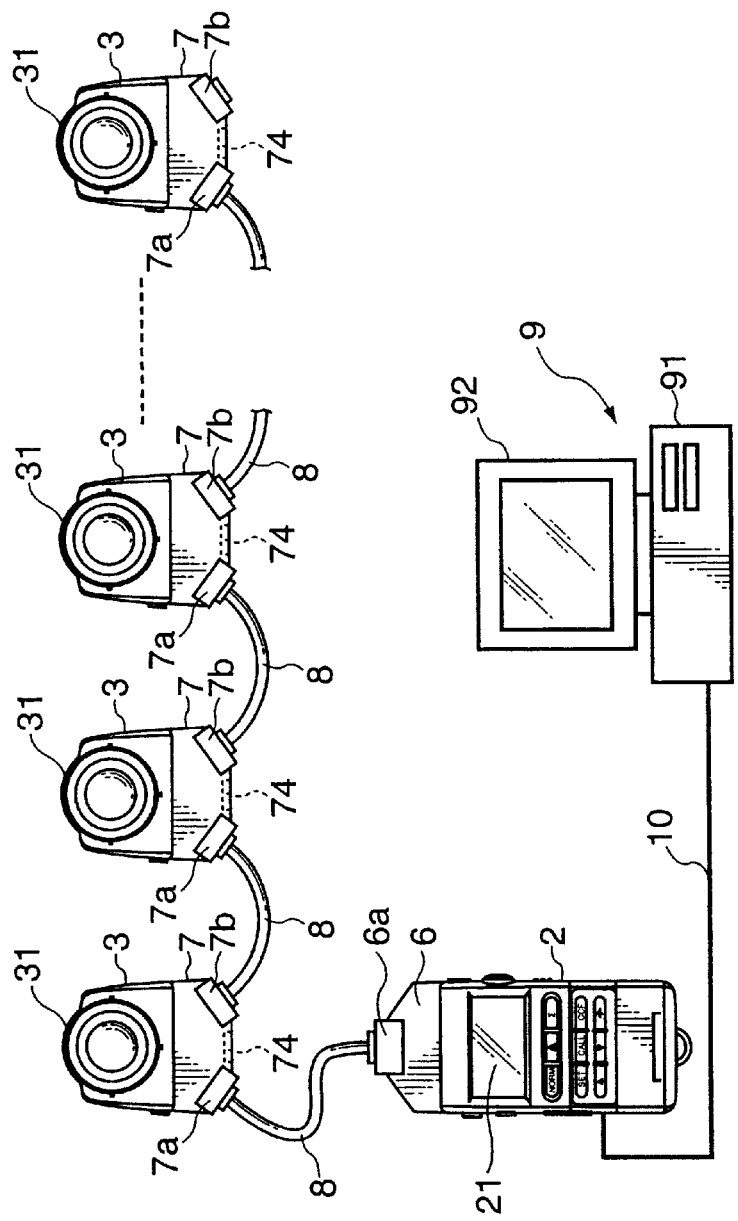
FIG. 6 is a plan view showing an example of a wired multi-point light measuring system in which a plurality of the light measuring units connected to the main unit as a cascade line connection in accordance with the embodiment.

As shown in FIG. 6, when a plurality of light measuring units 3 are connected to the main unit 2 as a cascade line connection by using adapters 6 and 7 for constituting a multi-point light measuring system, each light measuring unit 3 and the main unit 2 constitute an illuminance meter by communicating the data between the light measuring unit 3 and the main unit 2. The illuminance value measured by the light measuring unit 3 is displayed on the display panel 21 of the main unit 2. In this embodiment, thirty light measuring units 3 can be connected to the main unit 2. Each light measuring unit 3 connected to the main unit 2 is set a discrimination number "M" (M=0 to 29) for discriminating one light measuring unit 3 from the others. When the main unit 2 confirms the discrimination numbers "M" of the light measuring units 3 more than two, it executes the multi-point light measuring operation. The number of the light measuring units 3 which can be connected to the main unit 2 is not restricted by the above-mentioned example of thirty. It is possible to select an optional number of the light measuring units 3.

Figure 24:
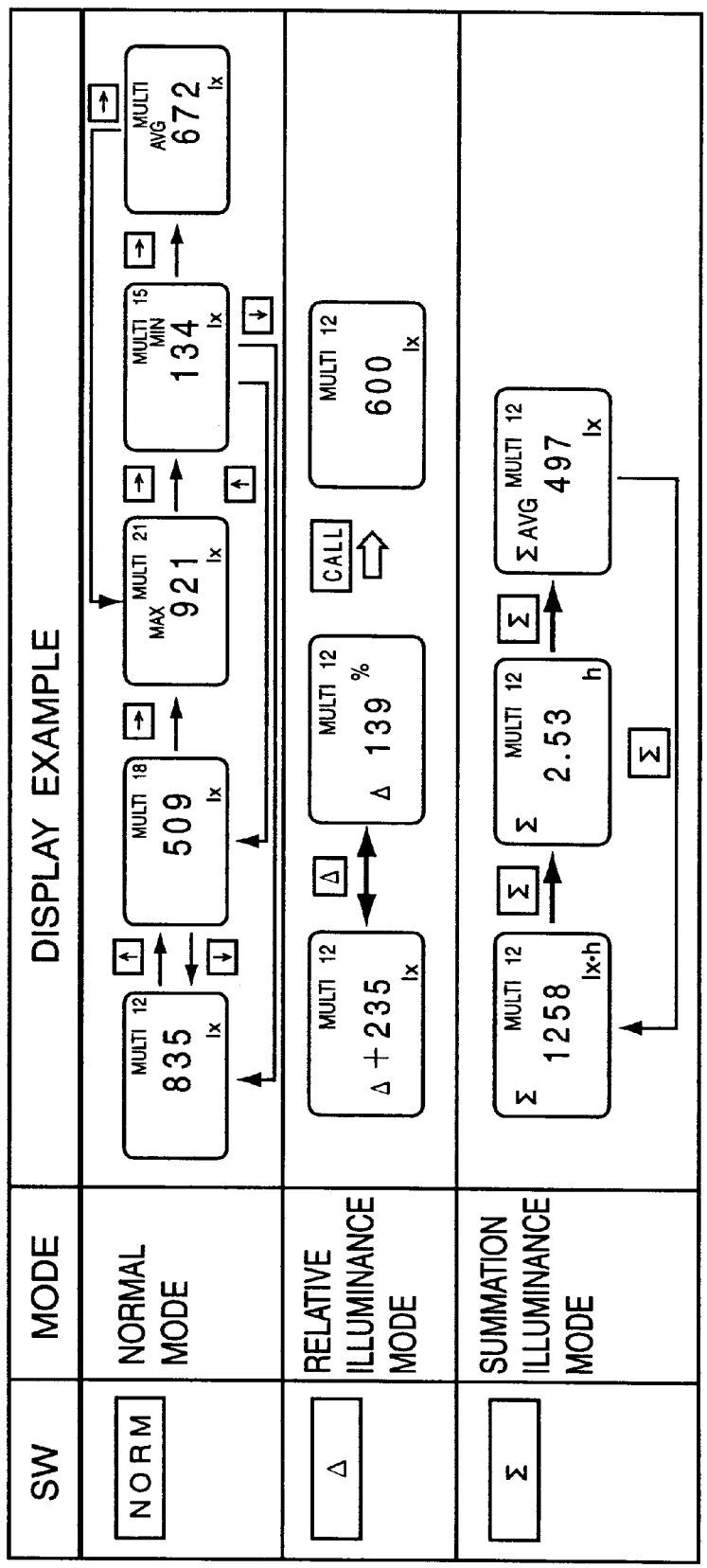
FIG. 24 is a table showing other examples of display on the display panel with respect to the measurement modes in the embodiment.

In the multi-point light measuring system, a character string of "MULTI" showing the multi-point measurement is displayed on the display panel 21 as shown in FIG. 24. Furthermore, the normal mode, the relative illuminance mode and the summation illuminance mode is selectable with respect to the light measuring unit 3 which is actually used for the measurement of illuminance. The discrimination number "M" of the light measuring unit 3 on service is displayed on the display panel 21. When a character string "MULTI 12" is displayed on the display panel 21, it shows that displayed value is measured by the light measuring unit 3 having the discriminating number "12".

In the multi-point light measuring system, a plurality of measurement values are obtained by changing the light measuring units on service, so that the largest value, the smallest value and the average value of the measurement values can be displayed on the display panel 21. The discrimination number "M" of the light measuring unit 3 which measures the largest value or the smallest value is displayed on the display panel 21 with the largest value or the smallest value (see the normal mode in FIG. 24).

The light measuring unit 3 in the multi-point light measuring system is selected by the switching operation of the up operation switch 222d and the down operation switch 222e. The discrimination number "M" displayed on the display panel 21 is increased one by one when the up operation switch 222d is switched on. Alternatively, it is decreased one by one when the down operation switch 222e is switched on. The light measuring unit 3 by which the illuminance is measured can be selected by using the up operation switch 222d and the down operation switch 222e. When the normal operation switch 221a is switched on, the normal mode is selected. When the Δ operation switch 221b is switched on, the relative illuminance mode is selected. When the Σ operation switch 221c is switched on, the summation illuminance mode is selected. Thus, the measurement value of the light measuring unit 3 on service corresponding to the selected mode is displayed on the display panel 21.

In any mode, when the shift operation switch 222f is cyclically switched on, the largest value, the smallest value and the average value are serially displayed on the display panel 21. Furthermore, when any operation switch 221a to 221c is switched on, the value displayed on the display panel 21 is changed to the value corresponding to the selected mode (see the normal mode in FIG. 24).

As shown in FIGS. 1 to 3, a main switch 24 is provided substantially at the center of a right side face of the main unit 2. Furthermore, a holding switch 25 and a releasing button 26 for detachably releasing the light measuring unit 3 are serially disposed above the main switch 24. When the main switch 24 is switched on, the electric power of the illuminance meter 1 is supplied. Since the main switch 24 is a sliding switch, when a sliding member is positioned above, the main switch is switched on. Alternatively, when the sliding member is positioned below, the main switch 24 is switched off.

When the holding switch 25 is switched on, the illuminance value "L" displayed on the display panel 21 is held. In this embodiment, the measurement of illuminance is repeated at a predetermined interval, for example, 500 ms by the light measuring unit 3, and the last measurement value is renewably displayed on the display panel 21. The holding state and non-holding state are alternatively changed when the holding switch 25 is switched on. When the holding state is selected, the value displayed on the display panel 21 is maintained as the measurement value at the time when the holding switch 25 is switched on.

Figure 7:
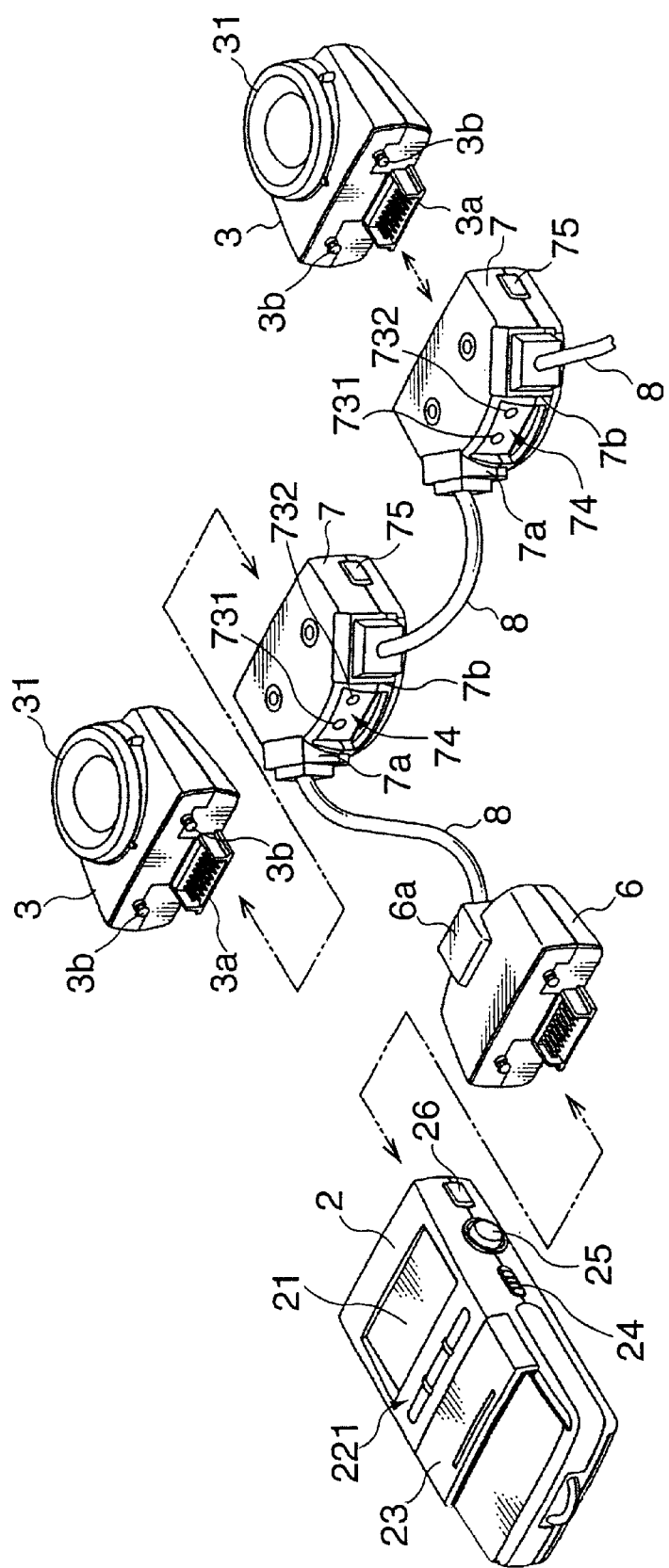
FIG. 7 is a perspective view showing the configuration of the multi-point light measuring system shown in FIG. 6.

When the releasing button 26 is pushed, the coupling of the main unit 2 and the light measuring unit 3 is released, and the light measuring unit 3 can be detached from the main unit 2. As shown in FIG. 7, a pair of pin shaped coupling members 3b are formed upper right and left sides on the bottom face of the light measuring unit 3. The main unit 2 has a coupling mechanism provided inside of a housing thereof and in the vicinity of the upper face (not shown in the figure). The releasing button 26 is connected to the coupling mechanism and it moves a hook member for coupling the coupling members 3b.

A digital interface connector 27 is provided substantially at the center of a left side face of the main unit 2. A DC electric power inlet 28 and a response speed switch 29 are serially provided above the digital interface connector 27.

The digital interface connector 27 is used for communicating the data to an external data processing apparatus such as a personal computer via a cable. In the multi-point light measuring system, measurement data from all the light measuring units 3 can be processed by the personal computer. When an AC adapter (see FIG. 9) is coupled to the DC electric power inlet 28, the illuminance meter 1 can be driven by external power source.

The response speed switch 29 is a sliding switch and used for selecting a response speed in the measurement of illuminance. When a sliding member of the response speed switch 29 is positioned above, a normal response speed is selected. Alternatively, when the sliding member is positioned below, a slow response speed slower than the normal response speed is selected. When the illumination is alternately varied such as a ripple light, the slow response speed is selected so as to measure the illuminance stably and accurately. Since a switching circuit for changing the response speed is provided in the light measuring unit 3, it is possible to provide the response speed switch 29 on the light measuring unit 3. In this embodiment, the response switch 29, however, is provided on the main unit 2 because the light measuring unit 3 is detachable from the main unit 2 and a plurality of light measuring units 3 can be connected to the main unit 2 as a cascade line connection for constituting the multi-point light measuring system. Thus, when the response speed switch 29 is operated, the response speed of all the light measuring units 3 connected to the main unit 2 can be changed at the same time. In the multi-point light measuring system, different luminous flux from the same light source are measured at different points. Thus, it is necessary that the response speed of the light measuring units 3 is the same with respect to the same illumination. If the response speed switch 29 is provided on each light measuring unit 3, it is troublesome to operate all the response speed switches 29 of the light measuring units 3 for changing the response speed. Thus, it is preferable to provide the response speed switch 29 on the main unit 2 by which the response speed of the light measuring units 3 can be changed from a remote position.

The light measuring unit 3 has a circular light measuring window 31 on a front face. The light measuring window 31 has a hemisphere diffusion plate 312 and a ring shaped frame 311. The inner face of the ring shaped frame 311 is slanted inside. A light measuring device such as SPD (Silicon Photo Diode) is disposed behind the diffusion plate 312. An analogous output terminal 32 for outputting an analogue signal corresponding to a quantity of received light by the light measuring device is provided on the left face of the light measuring unit 3.

As shown in FIG. 7, the male connector 3a is protruded from lower center of the bottom face of the light measuring unit 3. The male connector 3a has an array of plug type terminals and a channel shaped guide wall for enclosing the terminals. The female connector 2a (see FIG. 4) is provided inside the main unit 2 and in the vicinity of the upper face thereof. The female connector 2a has an array of receptacle type terminals and a groove to which the terminals and the guide wall of the male connector 3a are to be engaged. When the male connector 3a is inserted into the female connector 2a, the plug type terminals of the male connector 3a are electrically connected to the receptacle type terminals of the female connector 2a. At the same time, the above-mentioned hook member of the coupling mechanism is engaged with the coupling members 3b, so that the light measuring unit 3 is firmly locked with the main unit 2.

Figure 4:
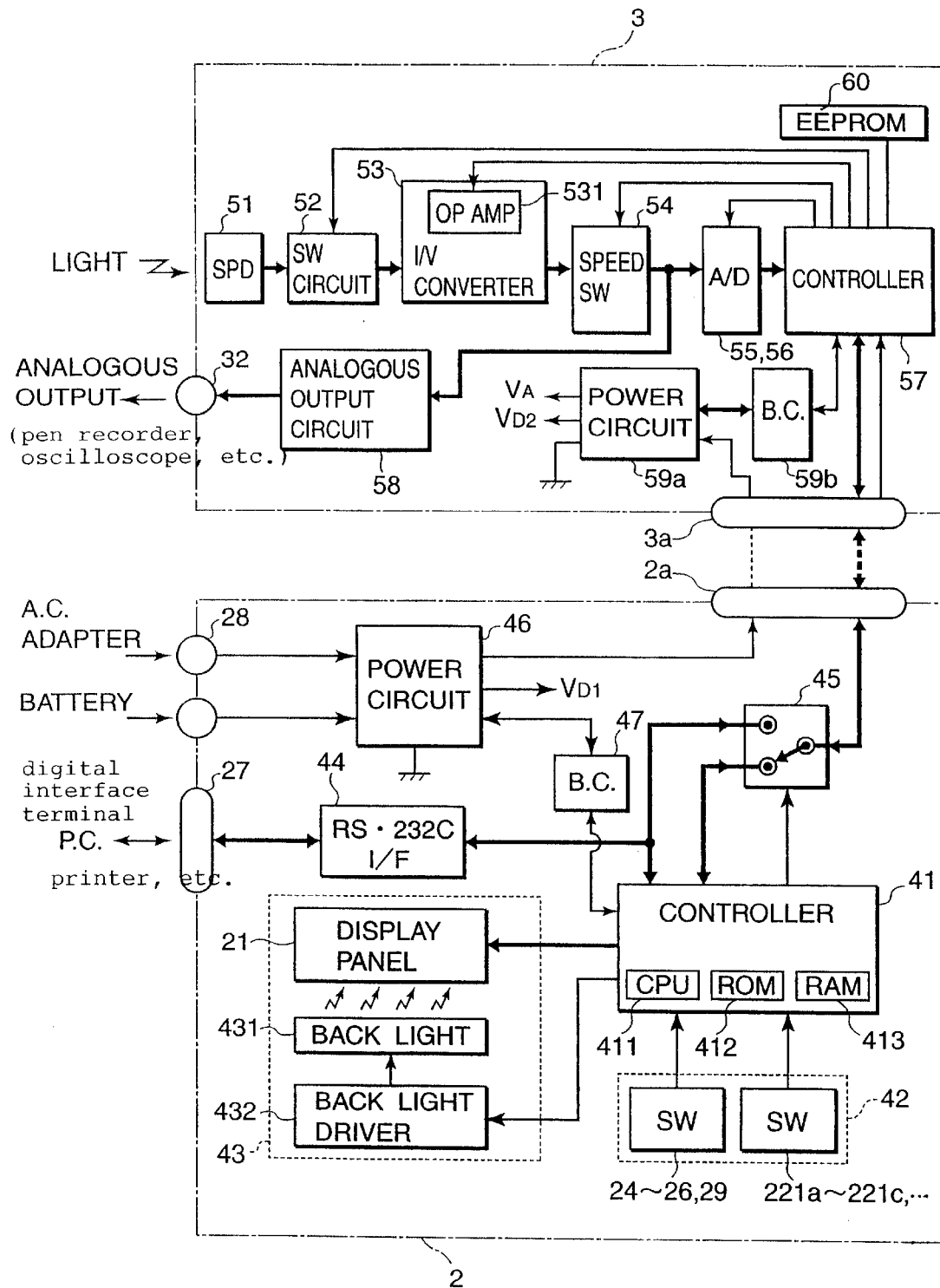
FIG. 4 is a block diagram showing a configuration of electric circuit of the illuminance meter.

A block diagram of the illuminance meter 1 is shown in FIG. 4. An electrical configuration of the main unit 2 is described with reference to FIG. 4.

The main unit 2 comprises a main unit controller 41 including a CPU (Central Processing Unit) 411, a ROM (Read Only Memory) 412 and a RAM (Random Access Memory) 413. A program for processing the measurement of illuminance and predetermined initial data are memorized in the ROM 412. The RAM 413 is used while the CPU 411 executes a calculation process of the measurement of illuminance responding to the program. The main unit controller 41 is electrically connected to an operation unit 42, a display unit 43 and a data communication interface 44 directly. Furthermore, it is connected to a light measuring unit controller 57 via a switching portion 45 and the connectors 2a and 3a. Thus, the illuminance meter 1 can measure the illuminance responding to the externally inputted instruction via the operation unit 42, and can display the measurement result on the display panel 21 included in the display unit 43.

The operation unit 42 is configured suitable for externally inputting the instructions which are necessary to the measurement of illuminance. The operation unit 42 is configured by the main switch 24, the response speed switch 29, the holding switch 25, the normal operation switch 221a, the A operation switch 221b, the Σ operation switch 221c, the SET switch 222a, the CALL switch 222b, the CCF switch 222c, the up operation switch 222d, the down operation switch 222e and the shift operation switch 222f.

The display unit 43 includes the above-mentioned display panel 21, and it displays the data from the main unit controller 41 via a display driver (not shown in the figure) on the display panel 21. In this embodiment, a passive type display panel is used as the display panel 21, so that a back light illuminator 431 is provided behind the display panel 21 for illuminating the display panel 21 from the rear face thereof. Switching on and off of the back light illuminator 431 is controlled by a back light driver 432 corresponding driving signals from the main unit controller 41.

The data communication interface 44 is electrically connected to the digital interface connector 27. When a cable connected to a personal computer or a printer is connected to the digital interface connector 27, the data such as the measurement data can be communicated between the main unit controller 41 and the external equipment via the digital interface connector 27. Thus, the flexibility of the illuminance meter 1 in this embodiment can be increased. In case that the personal computer (P.C.) 9 is externally connected to the digital interface connector 27 as shown in FIG. 6, when a switching command is transmitted to the main unit controller 41 from the personal computer 9, the main unit controller 41 controls the switching portion 45 to be connected to the data communication interface 44 (upper node in FIG. 6), so that the personal computer 9 is connected to the light measuring unit controller 57 via the data communication interface 44. Thus, the data can be communicated between the light measuring unit 3 and the personal computer 9, so that they configure an equivalent multi-point light measuring system.

The main unit 2 further comprises an electric power circuit 46 for supplying electric power to respective elements of the main unit 2. The electric power circuit 46 is electrically connected to the main unit controller 41 via a battery checker (B.C.) 47. The battery checker 47 checks an abnormality such as immovability or abnormal output voltage of the electric power circuit 46 responding to the instruction from the main unit controller 41, and outputs the check result to the main unit controller 41.

Figure 5:
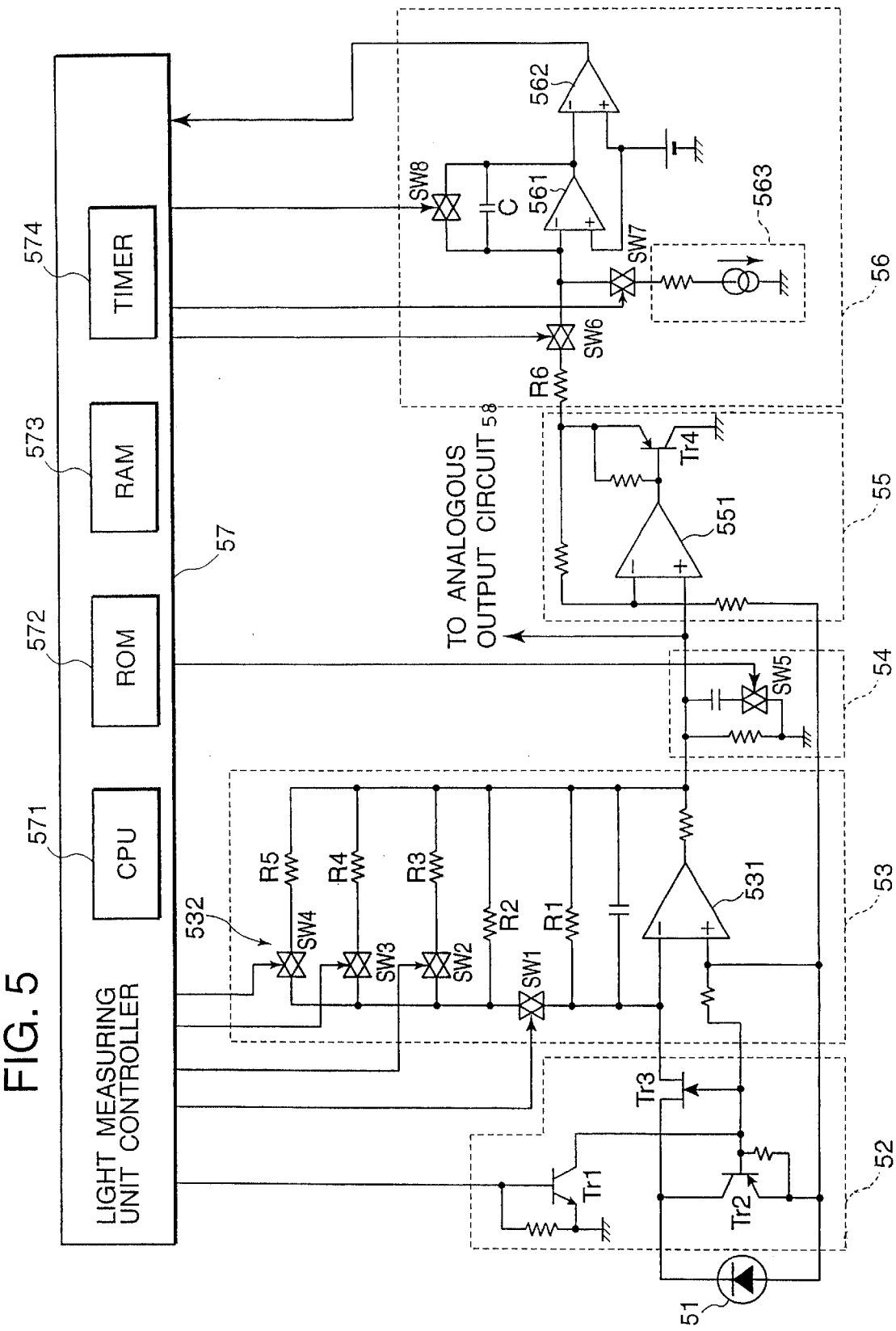
FIG. 5 is a circuit diagram in the light measuring unit of the illuminance meter.

An example of an electric circuit of the light measuring unit 3 is shown in FIG. 5. An electric configuration of the light measuring unit 3 is described with reference to FIGS. 4 and 5.

A light measuring device (SPD) 51 disposed behind the light measuring window 31 receives incident light and converts optical energy to electric energy. The light measuring device 51 outputs an electric signal corresponding to an amount of incident light to an I/V (Intensity/Voltage) converter 53 via a switching circuit 52. The switching circuit 52 is a noncontact switch for controlling the electric connection between the light measuring device 51 and the I/V converter 53 in a zero-calibration by simplified zero adjustment (hereinafter abbreviated as simplified zero-calibration).

As shown in FIG. 5, the switching circuit 52 is configured by three transistors Tr1 to Tr3. The pnp type transistor Tr2 is connected in parallel with the light measuring device 51. The field-effect transistor (FET) Tr3 is connected between a cathode of the light measuring device 51 and an inverting input terminal of an operational amplifier (hereinafter abbreviated as OP amp) 531 which is an element constituting the I/V converter 53. A gate of the transistor Tr3 and a base of the transistor Tr2 are respectively connected to a noninverting input terminal of the OP amp 531. A collector of an npn type transistor Tr1 is connected to the base of the transistor Tr2 and an emitter of the transistor Tr1 is grounded.

In the simplified zero-calibration, a standard of zero is not based on a light measuring surface of the light measuring device 51, but based on an input terminal of the I/V converter 53. The light measuring surface of the light measuring device 51 and the I/V converter 53 is electrically disconnected while the zero-calibration is executed. The simplified zero-calibration is automatically executed when the illuminance meter 1 is activated by switching on of the main switch 24, or measurement mode is switched.

When a high level control signal is inputted into the base of the transistor Tr1 from the light measuring unit controller 57, the transistor Tr1 is switched on. When the transistor Tr1 is switched on, the base of the transistor Tr2 and the gate of the transistor Tr3 become low level, so that the transistor Tr2 is switched on and the transistor Tr3 is turned off. The light measuring device 51 is electrically disconnected from the I/V converter 53 and it constitutes a closed circuit with the transistor Tr2. Thus, the simplified zero-calibration can be executed.

On the other hand, when a low level signal is inputted into the base of the transistor Tr1, the transistor Tr1 is turned off. When the transistor Tr1 is turned off, the base of the transistor Tr2 and the gate of the transistor Tr3 become high level, so that the transistor Tr2 is turned off and the transistor Tr3 is switched on. The light measuring device 51 is disconnected from the transistor Tr2, and it is electrically connected to the I/V converter 53. Thus, the measurement of illuminance can be executed by the light measuring device 51.

In this embodiment, the switching circuit 52 for electrically connecting and disconnecting the light measuring device 51 to and from the I/V converter 53 is configured by three transistors Tr1 to Tr3. The configuration of the switching circuit 52, however, is not restricted by the above-mentioned case. It is possible to adopt any configuration which can control the connection of the light measuring device 51 and the I/V converter 53.

The I/V converter 53 is an inversion amplifying circuit using the OP amp 531 which converts a photo-current outputted from the light measuring device 51 to a voltage signal, amplifies the voltage signal and outputs the analogous amplified voltage signal corresponding to a quantity of received light by the light measuring device 51. Five resistors R1 to R5 are connected in parallel between the inverting input terminal and output terminal of the OP amp 531. An analogous switch SW1 is provided between the inverting input terminal of the OP amp 531 and the resistor R2. Three analogous switches SW2 to SW4 are respectively serially connected to the resistors R3 to R5. By controlling the switching of the analogous switches SW1 to SW4, amplitude of the OP amp 531 can be varied in five steps. That is, the illuminance meter 1 has five measurement ranges, so that it is possible to measure the illuminance in wide range by changing the measurement range corresponding to the quantity of received light by the light measuring device 51. The four analogous switches SW1 to SW4 constitute a range switching circuit 532 which is controlled by the control signal from the light measuring unit controller 57.

Hereupon, the simplified zero-calibration at the start up of the illuminance meter 1 is described. When the illuminance meter 1 is activated by switching on of the main switch 24, operation of the operation switches are checked. After that, a calibration mode starts and the zero-calibration is executed. In the zero-calibration process, an electric power circuit 59a of the light measuring unit 3 is used. The above-mentioned four analogous switches SW1 to SW4 are controlled for changing five measurement ranges. Thus, a zero-point is measured in each measurement range under a condition that the light measuring device 51 is disconnected from the I/V converter 53.

When the switching circuit 52 is turned off, the light measuring device 51 is disconnected from the I/V converter 53. Under this condition, most of the output current from the light measuring device 51 flows to the transistor Tr2 with no relation whether the light measuring device 51 is shaded or not. Intensity of a current flowing into the OP amp 531 of the I/V converter 53 is too small to be regarded.

At first, all the switches SW1 to SW4 are switched on, and a value of feedback resistor of the OP amp 531 is defined by a composed value of the parallel resistors R1 to R5 (hereinafter this condition is called "first measurement range"). Under such the condition, when an A/D (analogue to digital) converter (A/D) 56 is driven, the illuminance is measured. An illuminance value "Loff1" in the first measurement range is used as an offset quantity for zero-calibration, since no current is inputted into the I/V converter 53. The offset value "Loff1" is memorized in a RAM 573 with a relation to the first measurement range.

When the measurement of the offset value "Loff1" with respect to the first measurement range is completed, only the switch SW4 is switched off, and the value of feedback resistor of the OP amp 531 is defined by a composed value of the parallel resistors R1 to R4 (hereinafter this condition is called "second measurement range"). Under such the condition, the illuminance is measured by driving the A/D converter 56. An offset value "Loff2" in the second measurement range is memorized in the RAM 573 with a relation to the second measurement range.

Similarly, the switches SW3 to SW1 are serially switched off, and offset values "Loff3" to "Loff5" in third to fifth measurement ranges are measured and memorized in the RAM 573 with relations to the third to fifth measurement ranges.

When the zero-calibration with respect to all the measurement ranges are completed, the electric power circuit 59a is turned off, and the mode of the illuminance meter 1 is automatically changed from the calibration mode to measurement mode. After that, normal measurement of illuminance can be started.

The analogous signals obtained in each measurement range set by the I/V converter 53 are supplied to a buffer 55 via a response speed switching circuit 54. Furthermore, the analogous signals are outputted to the analogous output terminal 32 via an analogous output circuit 58 (see FIG. 4).

The response speed switching circuit 54 is a smoothing circuit of parallel connection of a resistor and a capacitor for smoothing ripple voltage outputted from the I/V converter 53. An analogous switch SW5 is provided between the capacitor and the ground. By controlling switching on and off of the analogous switch SW5, the smoothing operation of the response speed switching circuit 54 is controlled. When the light measuring unit controller 57 controls the analogous switch SW5 switching off, the response speed switching circuit 54 does not smooth the output voltage from the I/V converter 53, so that the measurement of illuminance is executed by the normal speed. Thus, it is equivalent that the output voltage from the I/V converter 53 is inputted to the A/D converter 56 via the analogous output circuit 58 and the buffer 55. Alternatively, when light measuring unit controller 57 controls the analogous switch SW5 switching on, the response speed switching circuit 54 smoothes the output voltage from the I/V converter 53, so that the measurement of illuminance is executed by a speed slower than the normal speed. Thus, the smoothed output voltage (averaged ripple voltage) from the I/V converter 53 is inputted to the A/D converter 56 via the analogous output circuit 58 and the buffer 55.

The buffer 55 is a level converter configured by an OP amp 551 and a pnp type transistor Tr4 for matching the I/V converter 53 and the A/D converter 56.

The A/D converter 56 converts the analogous signal outputted from the I/V converter 53 and passing through the response speed switching circuit 54 and the buffer 55 to a digital signal. The A/D converter 56 is a double-integrating circuit using two OP amps 561 and 562. An analogous switch SW6 is provided between an output terminal of the buffer 55 and an inverting input terminal of the OP amp 561. An analogous switch SW7 is provided between the inverting input terminal of the OP amp 561 and a discharge circuit 563. An analogous switch SW8 is provided in a feedback circuit between an output terminal and the inverting input terminal of the OP amp 561. When the light measuring unit controller 57 controls the switching on and off of the analogous switches SW6 to SW8, the A/D converting operation (measurement of illuminance) of the A/D converter 56 can be controlled.

When the switch SW8 is switched on, the integrating circuit consists of the OP amp 561 is reset. After that, when the switches SW7 and SW8 are switched off and the switch SW6 is switched on, the voltage inputted through the resistor R6 from the buffer 55 is amplified by the OP amp 561. After passing a predetermined time period, when the switch SW6 is switched off and the switch SW7 is switched on, electric charges in the capacitor C is discharged through the discharging circuit 563. The OP amp 561 outputs two detection signals corresponding to start and finish of the discharge. These detection signals are inputted to the light measuring unit controller 57, so that the light measuring unit controller 57 counts discharge time "T" by using a timer 574. Since the discharge time "T" is in proportion to the quantity of incident light into the light measuring device 51, the light measuring unit controller 57 can calculate the illuminance by converting the discharge time "T" to a quantity of light per a unit of time.

As can be seen from FIG. 5, the light measuring unit controller 57 for controlling the I/V converter 53, the response time switching circuit 54 and the A/D converter 56 comprises a CPU 571, a ROM 572, a RAM 573 and the timer 574.

The light measuring unit controller 57 not only controls the light measuring operation corresponding to a command from the main unit controller 41, but also calculates a measurement result such as a relative illuminance value "ΔL" or a percentage "ΔL %" of the relative illuminance in the relative illuminance mode, a summation illuminance value "Lsum" in the summation illuminance mode, and a time average value "Lave" by using the measurement value with respect to each measurement mode. Furthermore, the light measuring unit controller 57 controls other predetermined operations with respect to the light measuring unit 3 such as battery check, output of analogous signal, memorization of standard illuminance value "Lr", limit values "Tlim" and "Elim" transmitted from the main unit 2 by corresponding to the command from the main unit controller 41.

The light measuring unit 3 comprises an electric power circuit 59a for supplying electric power to the elements of the light measuring unit 3. The electric power circuit 59a is electrically connected to the light measuring unit controller 57 via a battery checker (B.C.) 59b. The battery checker 59b checks an abnormality such as immovability or abnormal output voltage of the electric power circuit 59a responding to the instruction from the light measuring unit controller 57, and outputs the check result to the light measuring unit controller 57.

In the illuminance meter 1 in accordance with this embodiment, the light measuring unit 3 can be detached from the main unit 2, and a plurality of the light measuring units 3 can be connected to the main unit 2 as a cascade line connection so that a multi-point light measuring system can be configured. In order to check the abnormality of the battery in each light measuring unit 3 from the main unit 2 in the multi-point light measuring system, the battery checkers 47 and 59b are provided not only in the main unit 2 but also the light measuring unit 3. The main unit controller 41 of the main unit 2 outputs a command for battery check operation to each light measuring unit controller 57 of the light measuring unit 3, and receives the check result from each light measuring unit controller 57, so that the battery condition in the multi-point light measuring system can be watched. If a battery trouble occurs in any light measuring unit 3, an alarm message is displayed on the display panel 21 of the main unit 2.

An example of a multi-point light measuring system in which a plurality of the light measuring units 3 are connected to the main unit 2 of the illuminance meter 1 as a cascade line connection is shown in FIGS. 6 and 7. FIG. 6 is a plan view of the multi-point light measuring system and FIG. 7 is a perspective view thereof.

The multi-point light measuring system shown in FIGS. 6 and 7 is configured by wired adapters 6 and 7. A main unit adapter 6 is connected to the top of the main unit 2 and a plurality of light measuring unit adapters 7 are respectively connected to the bottom of the light measuring units 3. The main unit adapter 6 and one of the light measuring unit adapters 7, and respective adjoining two light measuring unit adapters 7 are connected by communication cables 8. As shown in FIG. 6, a main unit 91 of the personal computer 9 is connected to the digital interface connector 27 via a communication cable 10 so that a multi-point light measuring can be processed by the personal computer 9. In this case, the measurement result of each light measuring unit 3 including the data obtained by calculation of the measurement results are displayed on the display apparatus such as CRT (Cathode Ray Tube) 92. The personal computer 9 shown in FIG. 6 is configured by the main unit 91 and the display apparatus 92. However, a mobile personal computer or other data processing apparatus which can execute a multi-point light measuring program can be used.

The main unit adapter 6 has a cable connector 6a on a top face and a male connector 6b on a bottom face. The male connector 6b has substantially the same configuration as the male connector 3a of the light measuring unit 3. The main unit adapter 6 and the main unit 2 are coupled by inserting the male connector 6b into the female connector 2a of the main unit 2.

The light measuring unit adapter 7 has a hexagonal section in which two corners of a laterally oblong rectangular are cut. A female connector 7c (see FIG. 9) having substantially the same configuration as the female connector 2a is provided on a flat top face of the light measuring unit adapter 7. Two cable connectors 7a and 7b are respectively provided on the slanted faces positioned at the cut corners of the rectangular. A concave portion 74 is formed on a bottom face between the slanted faces. The cable connectors 7a and 7b have substantially the same configuration as the cable connector 6a. Connectors provided at both ends of the communication cable 8 can be connected to these cable connectors 6a, 7a and 7b.

Figure 8:
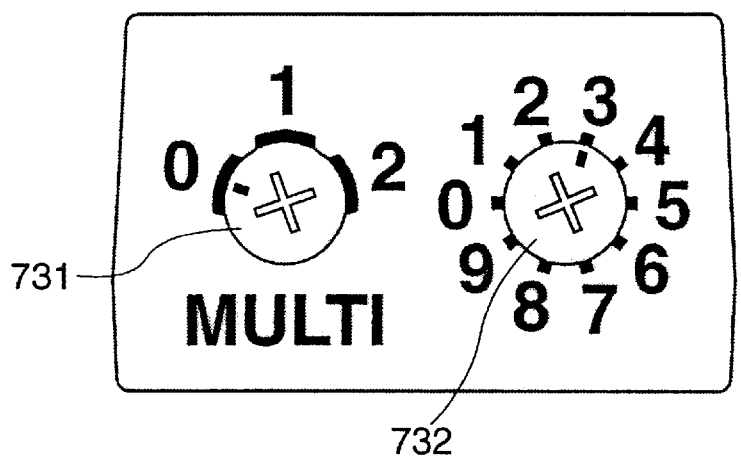
FIG. 8 is a plan view showing rotary switches used for setting a discrimination number "M" of the light measuring unit.

Two rotary switches 731 and 732 for setting the discrimination number "M" of the light measuring unit 3 are provided on the concave portion 74. The left rotary switch 731 is used for setting a numeral in the second digit of the discrimination number "M". As shown in FIG. 8, three numerals "0", "1" and "2" can be selected by the left rotary switch 731. The right rotary switch 732 is used for setting a numeral in the first digit of the discrimination number "M". As shown in FIG. 8, ten numerals "0" to "9" can be selected by the right rotary switch 732. When the numeral "0" is selected by the left rotary switch 731 and the numeral "3" is selected by the right rotary switch 732, the discrimination number "M" of the light measuring unit adapter 7 is set to be "3".

The switch for setting the discrimination number "M" is not restricted by the rotary switch, and another switch such as dip switch can be used. Since the discrimination number "M" is used for discriminating a light measuring unit 3 from others, it is not restricted by numeral. Characters such as alphabet or a combination of the numeral and the character such as "A0" to "A9", "B0" to "B9" and "C0" to "C9" can be used for discriminating thirty number of the light measuring units 3. In this case, the left rotary switch 731 in FIG. 8 selects the symbols "A", "B" and "C" instead of the numerals "1", "2" and "3".

The male connector 3a of each light measuring units 3 is inserted into the female connector 7c of the light measuring unit adapter 7 so that the light measuring unit adapter 7 is connected to the light measuring unit 3. The cable connector 6a of the main unit adapter 6 and the cable connector 7a of a first light measuring unit adapter 7 is connected by the communication cable 8. Furthermore, a cable connector 7b of a light measuring unit adapter 7 and a cable connector 7a of adjoining another light measuring unit adapter 7 is connected by the communication cable 8 in each case. Thus, the main unit 2 and the light measuring units 3 are connected as the cascade line connection.

Figure 9:
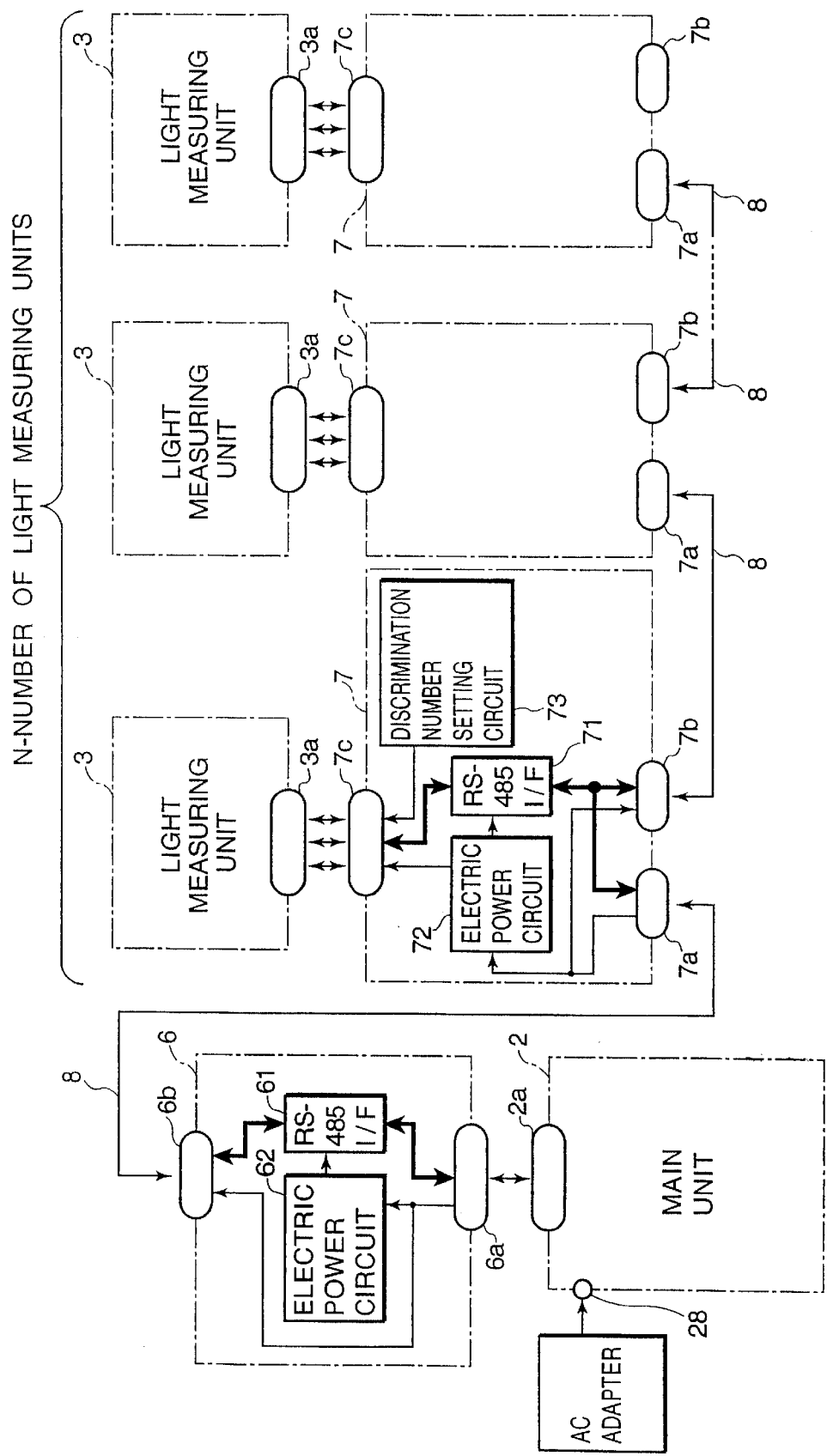
FIG. 9 is a block diagram showing configurations of a main unit adapter and a light measuring unit adapter used in a wired multi-point light measuring system in the embodiment.

Block diagrams of the adapters 6 and 7 used in a wired multi-point light measuring system are shown in FIG. 9. As can be seen from FIG. 9, the main unit adapter 6 comprises an interface circuit 61 for controlling serial data communication by a system of RS-485 and an electric power circuit 62 for supplying electric power to the interface circuit 61. The light measuring unit adapter 7 comprises an interface circuit 71 for controlling serial data communication by a system of RS-485, an electric power circuit 72 for supplying electric power to the interface circuit 71, and a discrimination number setting circuit 73 for setting a discrimination number "M" of the light measuring unit 3 connected thereto.

The cable connectors 7a and 7b of the light measuring unit adapter 7 are electrically equivalent. Thus, there is no necessity to distinguish the cable connectors 7a and 7b when the communication cables 8 are connected. The communication cables 8 can be connected at random for constituting the multi-point light measuring system.

Electric power is supplied to the electric power circuit 62 of the main unit adapter 6 and the electric power circuit 72 of the light measuring unit adapter 7 from the electric power circuit 46 of the main unit 2 through the communication cables 8. The electric power circuits 62 and 72 convert the voltage of the supplied electric power to a predetermined voltage and they supply the converted electric power to the interface circuits 61 and 71. The interface circuits 61 and 71 can communicate the data with the main unit controller 41 of the main unit 2 or the personal computer 9 by the RS-485 system.

The discrimination number setting circuit 73 converts the discrimination number "M" (decimal number) set by the rotary switches 731 and 732 to a binary code consists of two bits data corresponding to second figure and four bits data corresponding to first figure. The binary code is inputted to the light measuring unit controller 57. When the discrimination number "M" is configured by the symbols or the combination of a symbol and a numeral, it is preferable that predetermined binary codes corresponding to the discrimination numbers "M" are memorized in a memory, and the discrimination number setting circuit 73 searches a binary code corresponding to the discrimination number "M" in the memory and outputs the searched binary code.

In the multi-point light measuring system in this embodiment, an inherent discrimination number "M" can be set with respect to each light measuring unit 3, so that the measurement point where the illuminance is measured can be specified by the discrimination number "M". The measurement result and the measurement point can easily be corresponded. Thus, it is no need to consider the order of connection of the light measuring units 3 in the cascade line connection. Furthermore, the light measuring unit 3 which is to be used for the measurement of illuminance can easily be selected by inputting the discrimination number "M" from the main unit 2 or the personal computer 9.

Figure 10:
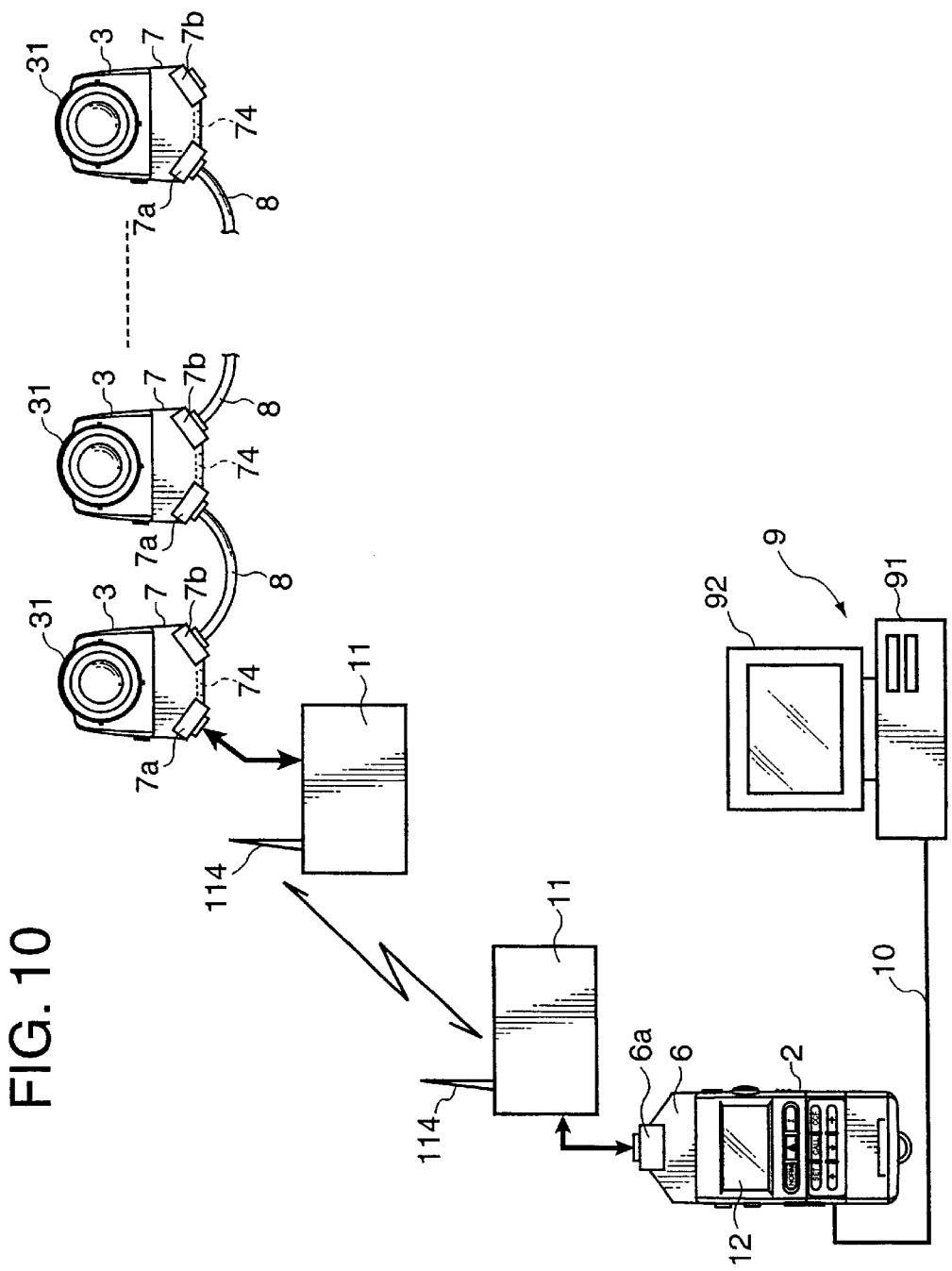
FIG. 10 a plan view showing a modification of a wireless multi-point light measuring system in which a plurality of the light measuring units connected to the main unit as a cascade line connection in accordance with the embodiment.

A modification of a multi-point light measuring system in the embodiment is shown in FIG. 10. As can be seen from FIG. 10, the modification of the multi-point light measuring system further comprises a pair of wireless adapters 11 instead of the communication cable 8 for connecting between the main unit adapter 6 and the first light measuring unit adapter 7. The wireless adapters 11 are respectively connected to the cable connector 6a of the main unit adapter 6 and the cable connector 7a of the light measuring unit adapter 7. The data are communicated between the wireless adapters 11 by a data carrier of radio beams.

Figure 11:
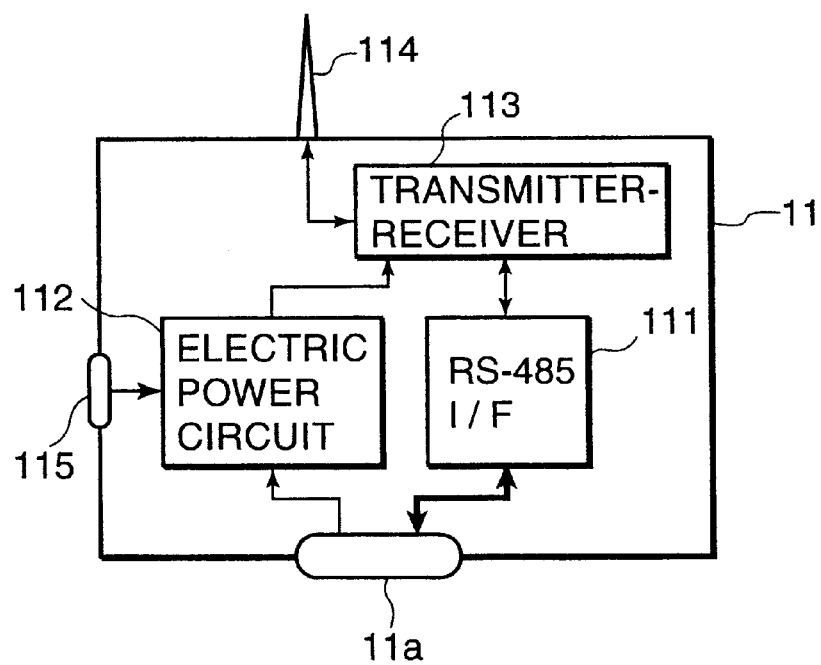
FIG. 11 is a block diagram showing a configuration of a wireless adapter used in the wireless multi-point light measuring system shown in FIG. 10.

A block diagram of the wireless adapter 11 is shown in FIG. 11. The wireless adapter 11 comprises an interface circuit 111 for controlling serial data communication by a system of RS-485, a transmitter-receiver 113 and an electric power circuit 112 for supplying electric power to the interface circuit 111 and the transmitter-receiver 113. The interface circuit 111 serves substantially the same as the interface circuits 61 and 71 shown in FIG. 9. The transmitter-receiver 113 serving as the transmitter converts the communication data outputted from the interface circuit 111 to a transmitting signal. The transmitting signal is outputted from an antenna 114. The transmitter-receiver 113 serving as the receiver receives the transmitting signal by the antenna 114 and modulates the transmitting signal to the communication data. The modulated communication data is inputted to the interface 111.

The electric power circuit 112 serves substantially the same as the electric power circuits 62 and 72 shown in FIG. 9. The electric power circuit 46 of the main unit 2, however, can not supply the electric power to the electric power circuit 112 of the wireless adapter 11 which is connected to the light measuring unit 3, so that the electric power is supplied to the electric power circuit 112 from an independent electric power source (not shown in the figure). Furthermore, the wireless adapter 11 has an electric power inlet 115 to which an AC adapter can be connected so as to supply the electric power to each element of the light measuring unit 3 via the electric power circuit 112 while the illuminance is measured continuously in a long time.

In this modification of the wireless multi-point light measuring system, the radio beam is used as the data carrier. The data carrier, however, is not restricted by the radio beam. It is possible to use a light beam such as infrared light or a visible light as the data carrier. When an obstacle exists between the main unit 2 and the light measuring unit 3 to which the wireless adapter 11 is connected, it is preferable to use the radio beam as the data carrier which cannot be interfered by the obstacle.

In the wireless multi-point light measuring system shown in FIG. 10, a pair of wireless adapters 11 is used so as to configure single wireless data communication path, and all the light measuring units 3 are connected by the communication cables 8. The configuration of the wireless multi-point light measuring system is not restricted by the above-mentioned case. It is possible that the light measuring units 3 are divided into a plurality of groups and a plurality of wireless data communication paths are used. The light measuring units 3 included in the same group are respectively connected by the light measuring unit adapters 7 and the communication cables 8 as the cascade line connection. The wireless adapters 11 are respectively connected to the light measuring unit adapters 7 positioned at an end of the cascade line connection so as to communicate the wireless adapter 11 connected to the main unit 2. In the latter case, it is possible to use the same frequency of the radio beam as the carrier in each wireless data communication path. Alternatively, it is possible to use different frequency of the radio beam in each wireless data communication path with respect to each group of the light measuring units 3.

A light measuring operation of the multi-point light measuring system in this embodiment is described. In the multi-point light measuring system, the data is communicated between the light measuring unit controller 57 in each light measuring unit 3 and the main unit controller 41 of the main unit 2 or the controller of the main unit 91 of the personal computer 9 while the illuminance values at the points of the light measuring units 3.

At first, a command is transmitted from the main unit controller 41 of the main unit 2 to the light measuring unit controller 57 of the light measuring unit 3 which is to be used for the measurement of illumination. The light measuring unit controller 57 executes the measurement of illumination, the calculation of the measurement values corresponding to the measurement mode by following the command. The results of the measurement, the calculation are transmitted to the main unit controller 41 of the main unit 2. The results will be displayed on the display panel 21. Thus, the measurement of illumination at the position where the light measuring unit 3 on service is completed.

Figures 12, 13:
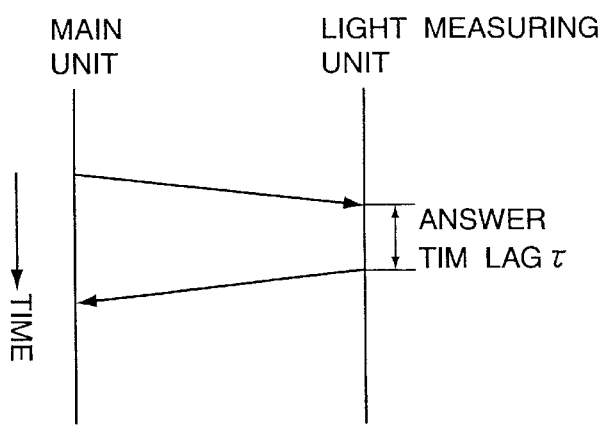
FIG. 12 is a drawing showing a format of a command communicated between the main unit and the light measuring units in the multi-point light measuring system in the embodiment.
FIG. 13 is a drawing showing an answer time lag τ from a time when the light measuring unit receives a command from the main unit to a time when the light measuring unit responds the command in the embodiment.

FIG. 12 shows an example of a format of a command communicated between the light measuring unit 3 and the main unit 2 or the personal computer 9. Character strings "STX" and "ETX" designate data showing top and end of the command. A character string "BCC" designates data used in parity check. The contents of the command consists of the discrimination number "M", a command number and a belonging data of the command. By such the command, the light measuring unit 3 to be used is specified by the discrimination number "M" and the operation to be executed by the light measuring unit 3 is controlled by the command number and the belonging data "D".

When the command is transmitted to the light measuring unit 3 from the main unit 2 or the personal computer 9, the discrimination number "M" is confirmed by the light measuring unit controller 57 in each light measuring unit 3. The operation corresponding to the command number is executed only in the light measuring unit 3 having the same discrimination number "M". The result of the operation is transmitted to the main unit 2 or the personal computer 9 from the light measuring unit 3 on service, if necessary. The result of the operation is transmitted by the format shown in FIG. 12.

When the command is transmitted from the light measuring unit 3 to the main unit 2 or the personal computer 9, the discrimination number "M" and the command number included in the command are confirmed by the main unit controller 41 of the main unit 2 or the main controller of the personal computer 9. After that, the belonging data "D" of the command is processed for displaying the belonging data "D" on the display panel 21, for memorizing the belonging data "D" into the RAM 413 in the main unit 2 or the personal computer 9.

The command number is a numerical code designating the contents of the command. Examples of the command number and the contents thereof transmitted to the light measuring unit controller 57 of the light measuring unit 3 from the main unit controller 41 of the main unit 2 or the main controller of the personal computer 9 are shown in the following table 1.

TABLE 1

| Command No. | Contents |
| --- | --- |
| 10 | Reading measurement values (illuminance, Δ, %) |
| 11 | Reading summation values (Lsum, ΣT, Lsum/ΣT) |
| 20 | Reading standard illuminance value Lr |
| 21 | Setting standard illuminance value Lr |
| 22 | Reading CCF value |
| 23 | Setting CCF value (direct) |
| 24 | Setting CCF value (holding value) |
| 25 | Reading limit values |
| 26 | Setting summation limit value Elim |
| 27 | Setting time limit value Tlim |
| 50 | Reading measurement ranges |
| 51 | Setting answer time lag |
| 52 | Shifting power saving mode |
| 53 | Checking connection of light measuring units |
| 54 | Switching connection modes |

In The above-mentioned table 1, the reading commands such as "Reading measurement values" and "Reading summation values" are the instruction for transmitting the data in the light measuring unit 3 wich are for example, the data memorized in the memory or the data obtained by the measurement to the main unit 2. The setting comands such as "Setting standard illuminance value Lr" and "Setting summation limit value Elim" are the instruction for memorizing the data transmitted from the main unit 2 into the memory of the light measuring unit 3.

The command "Setting answer time lag" having the command number 51 is the instruction for setting an answer time lag "τ" corresponding to a delay time "τ" from a time when the light measuring unit 3 receives the command from the main unit 2 to a time when the light measuring unit 3 responds the command to each light measuring unit 3 (see FIG. 13). The setting of the answer time lag "τ" is executed first when the operation of the multi-point light measuring system is started so that the data can smoothly communicated between the light measuring units 3 and the main unit 2.

When the multi-point light measuring system is started or the battery is changed, the answer time lag "τ" of each light measuring unit 3 is counted for confirming the connection of the light measuring unit 3 having the discrimination number "M". Furthermore, it is possible to judge whether the light measuring unit 3 having the discrimination number "M" is connected by the wired system using the communication cable or by the wireless system using the wireless adapters 11. For judging the configuration of the multi-point light measuring system, two kinds of threshold values "τ1" and "τ2" (τ2>τ1) are used. When the answer time lag "τ" is larger than "τ2" (τ>τ2), it is judged that the light measuring unit 3 having the discrimination number "M" is not connected. When the answer time lag "τ" is equal to or smaller than "τ2" but larger than "τ1", it is judged that the light measuring unit 3 having the discrimination number "M" is connected by the wireless system. When the answer time lag "τ" is equal to or smaller than "τ1", it is judged that the light measuring unit 3 having the discrimination number "M" is connected by the wired system.

The sequence of the data communication in the wireless system is generally different from that of the wired system. In the wired system shown in FIG. 6, the command is outputted only once from the main unit 2 to the light measuring unit 3. On the other hand, in the wireless system shown in FIG. 10, the data communication is repeated at least twice (preferably more than three times) between the pair of wireless adapters 11 for increasing the reliability of the data communication by the radio beams. Thus, the response from the light measuring unit 3 (answer time lag "τ") in the wireless system becomes slower than that in the wired system. It is possible to judge the configuration of the multi-point light measuring system from the length of the answer time lag "τ". The threshold value "τ1" (for example 50 ms) is the longest response time responsive in the wired system, The threshold value "τ2" (for example 150 ms) is the longest response time responsive in the wireless system.

The command "Shifting power saving mode" having the command number 52 in the table 1 is the instruction for changing the drive mode of the light measuring unit 3 to the power saving mode.

In the wired system shown in FIG. 6, the electric power is supplied to the electric power circuit 59a of each light measuring unit 3 from the electric power circuit 46 of the main unit 2. When each light measuring unit 3 frequently measures the illuminance at an interval, for example, 500 ms and the measurement result is displayed on the display panel 21, the electric power circuit 59a of the light measuring unit 3 is stopped while the light measuring unit 3 is off service of the measurement in the power saving mode.

The command "Switching connection mode" having the command number 54 is the instruction outputted from the main controller of the personal computer 9 to the main unit controller 41 of the main unit 2 for changing the controller of the measurement of illuminance by the light measuring unit 3 from the main unit controller 41 of the main unit 2 to the main controller of the personal computer 9.

Since the multi-point light measuring system in this embodiment can operate the summation illuminance mode, each light measuring unit 3 continues the measurement of illuminance at the predetermined interval while it is not selected as the object of the data communication by the main unit 2. Thus, the time period while the power saving mode is effective with respect to each light measuring unit 3 is relatively short. The multi-point light measuring system, however, includes many light measuring units 3, so that an amount of the electric power saved by the power saving mode in the multi-point light measuring system is not regardless.

An operation of the multi-point measurement of illuminance by the multi-point light measuring system in this embodiment is described with reference to the flowcharts shown in FIGS. 14 to 21. As mentioned above, the same data are repeatedly transmitted between the wireless adapters 11 in the wireless system shown in FIG. 10 for maintaining the reliability of the data communication. The data communication process in the wireless system, however, is substantially the same as that in the wired system described below.

Figure 14:
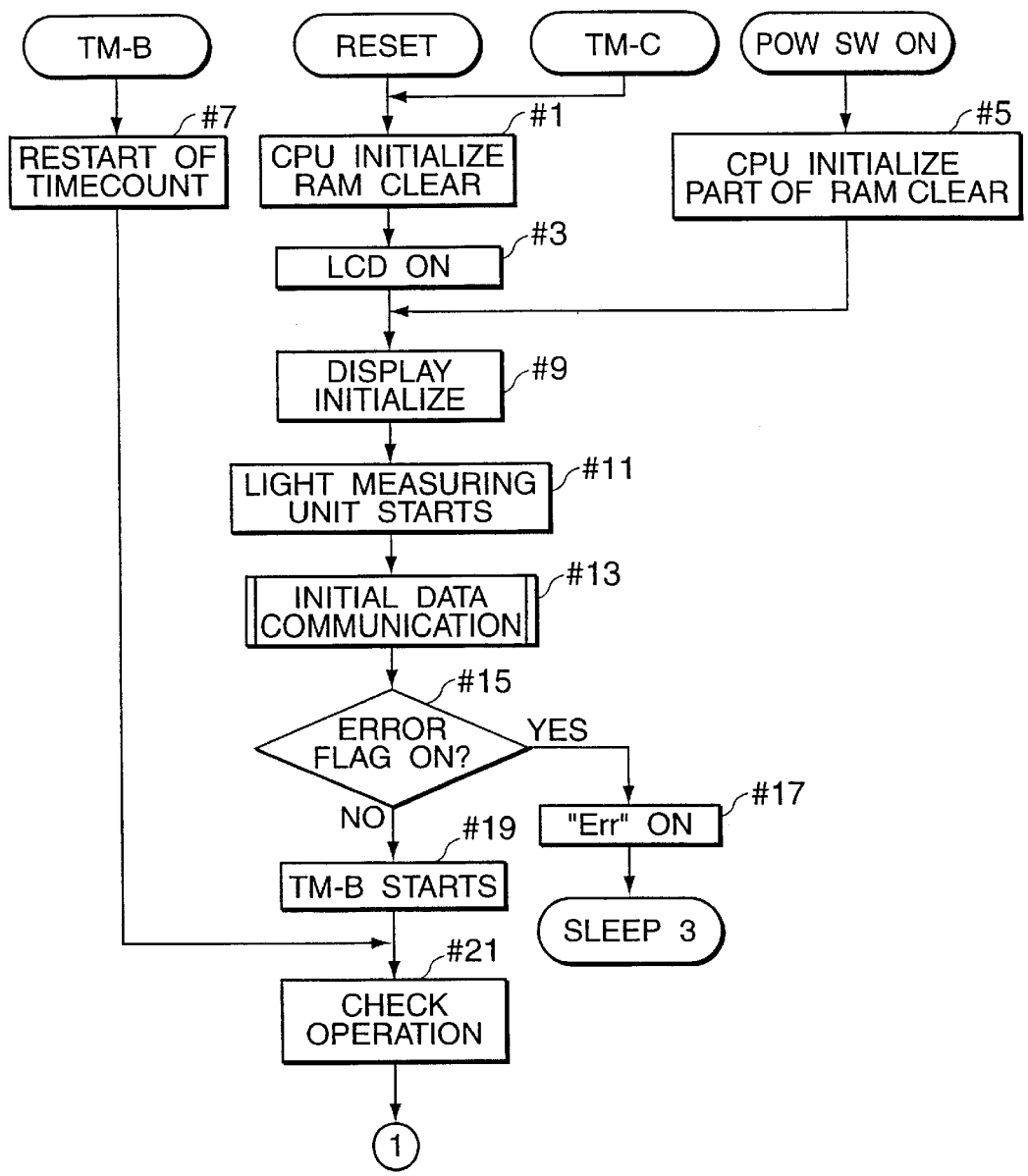
FIG. 14 is a flowchart showing a part of a main flow of an operation of the multi-point light measuring system in the embodiment.
Figure 15:
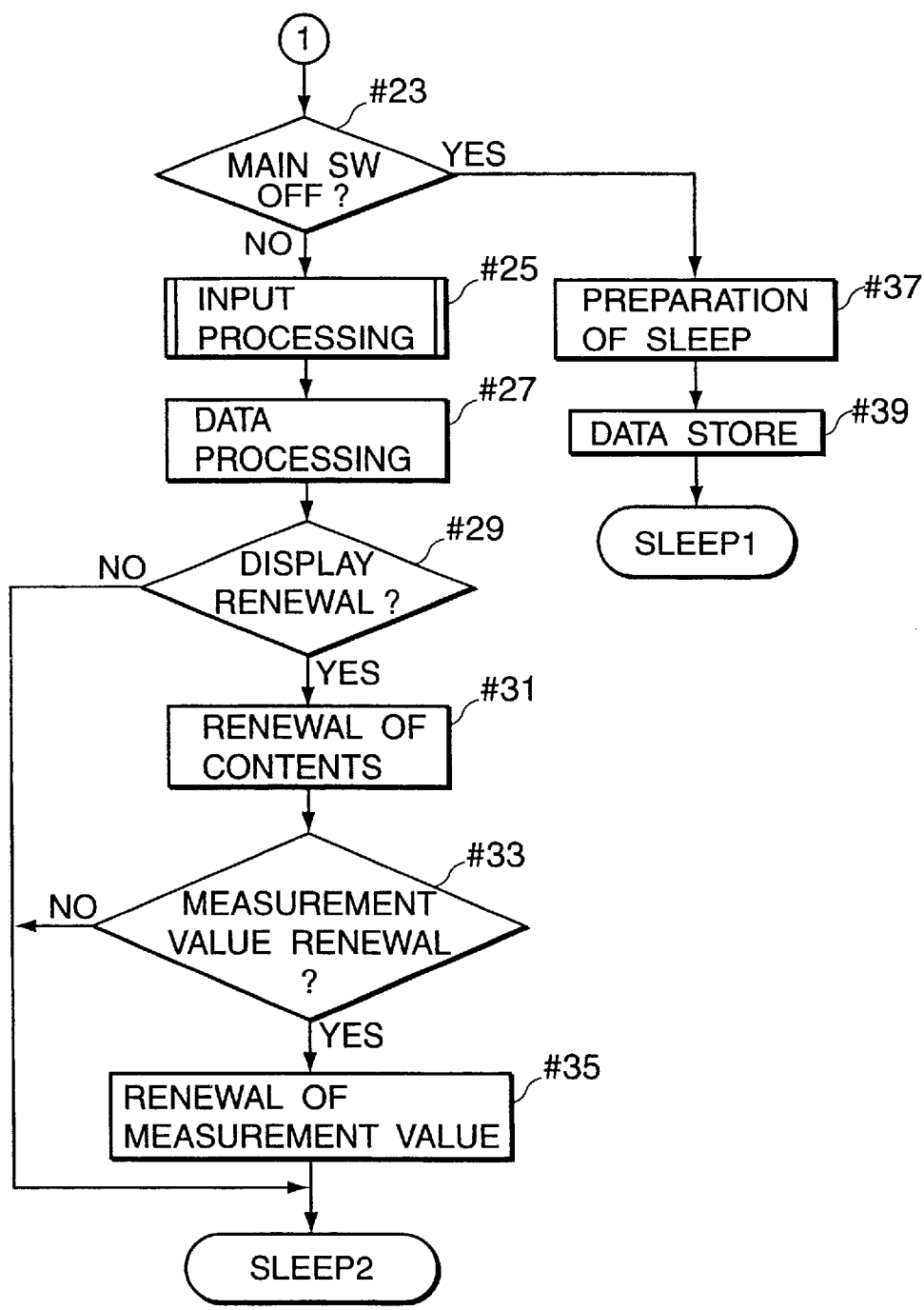
FIG. 15 is a flowchart showing the remainder of the main flow shown in FIG. 14.

FIGS. 14 and 15 show a main routine of the multi-point light measuring process. For measuring the illuminance at a plurality of points by using the multi-point light measuring system, a user previously sets the discrimination number "M" of each light measuring unit 3 by using the rotary switches 731 and 732 of each light measuring unit adapter 7, and positions each light measuring unit 3 at a predetermined measurement point. After that, when the user switches on the main switch 24, the multi-point light measuring will be started.

A flow started from a box labeled "RESET" in FIGS. 14 and 15 is used when a battery in the main unit 2 is renewably changed. A flow started from a box labeled "POW SW ON" is used when the main switch 24 is switched on. A flow started from a box labeled "TM-B" is used in an input detection process. In the input detection process, when a timer B (TM-B) counts a predetermined time, for example 10 ms, the main unit controller 41 of the main unit 2 judges whether any operation switch included in the first and second groups 221 and 222 is operated or not. When any operation switch is switched on, the multi-point light measuring system is controlled for following the contents of the input signal. In the flowcharts, timer is abbreviated as "TM" and the light measuring unit is abbreviated as "PS UNIT".

When the battery in the main unit 2 is changed, an I/O (Input/Output) port of a CPU serving as the main unit controller 41 is initialized and data memorized in the RAM 413 are cleared (Step #1). All LCD segments of the display panel 21 is turned on while a predetermined time period such as two seconds passes so as to check the abnormality of the display panel 21 (Step #3). Subsequently, the contents of the display on the display panel 21 are initialized (Step #9).

On the other hand, when the main switch 24 is switched on, the I/O port of the CPU of the main unit 2 is initialized and a part of the data memorized in the RAM 413 is cleared (Step #5). Subsequently, the flow proceeds to the step #9.

After initializing the display panel 21, the electric power is supplied to the electric power circuit 59a in each light measuring unit 3, so that the light measuring unit controller 57 is started (Step #11). When the light measuring unit controller 57 of the light measuring unit 3 is started, it reads the discrimination number "M" set in the light measuring unit adapter 7 and memorizes it into an EEPROM 60 (see FIG. 4).

Figure 16:
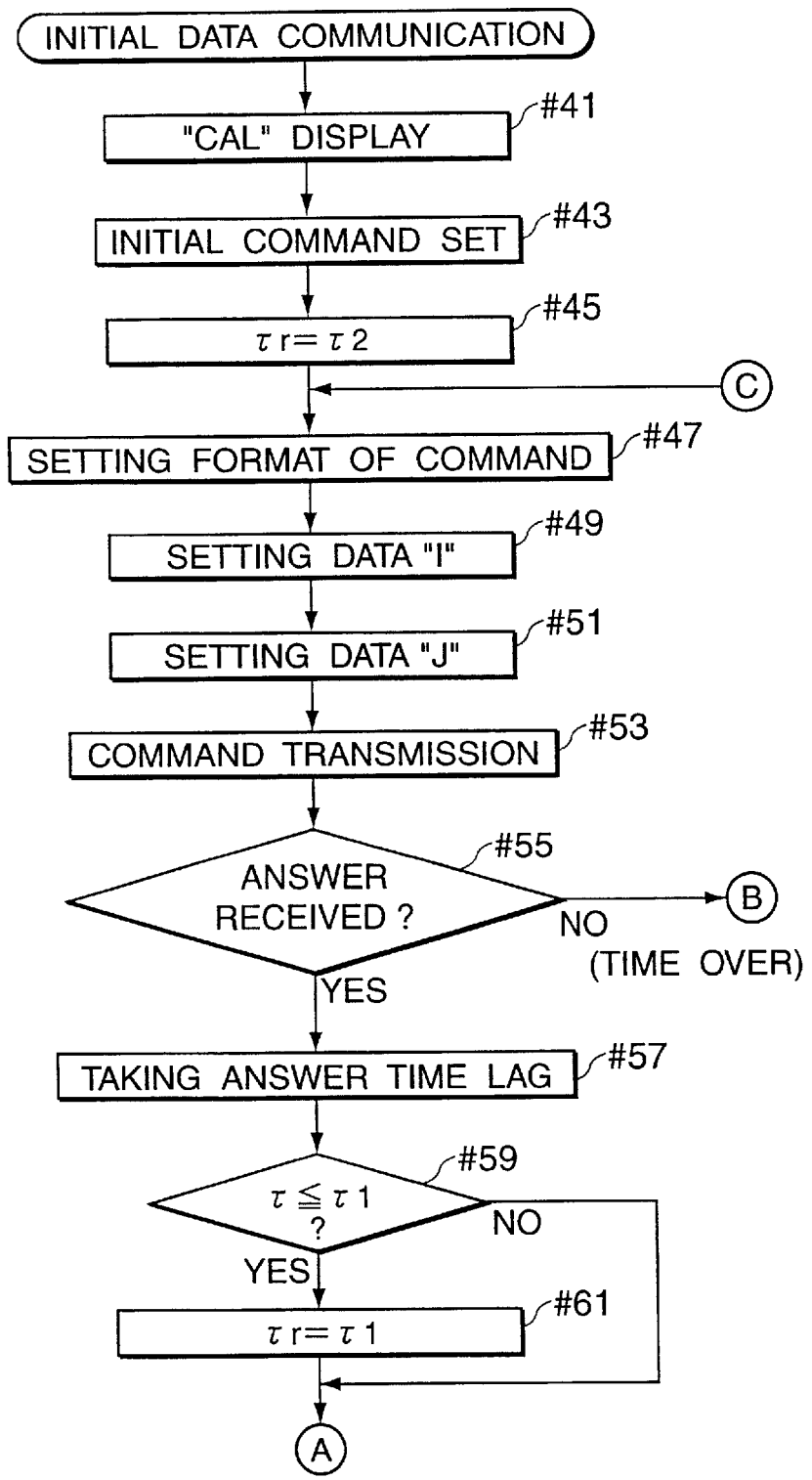
FIG. 16 is a flowchart showing a part of an initial data communication flow in step #13 in the main flow shown in FIG. 14.
Figure 17:
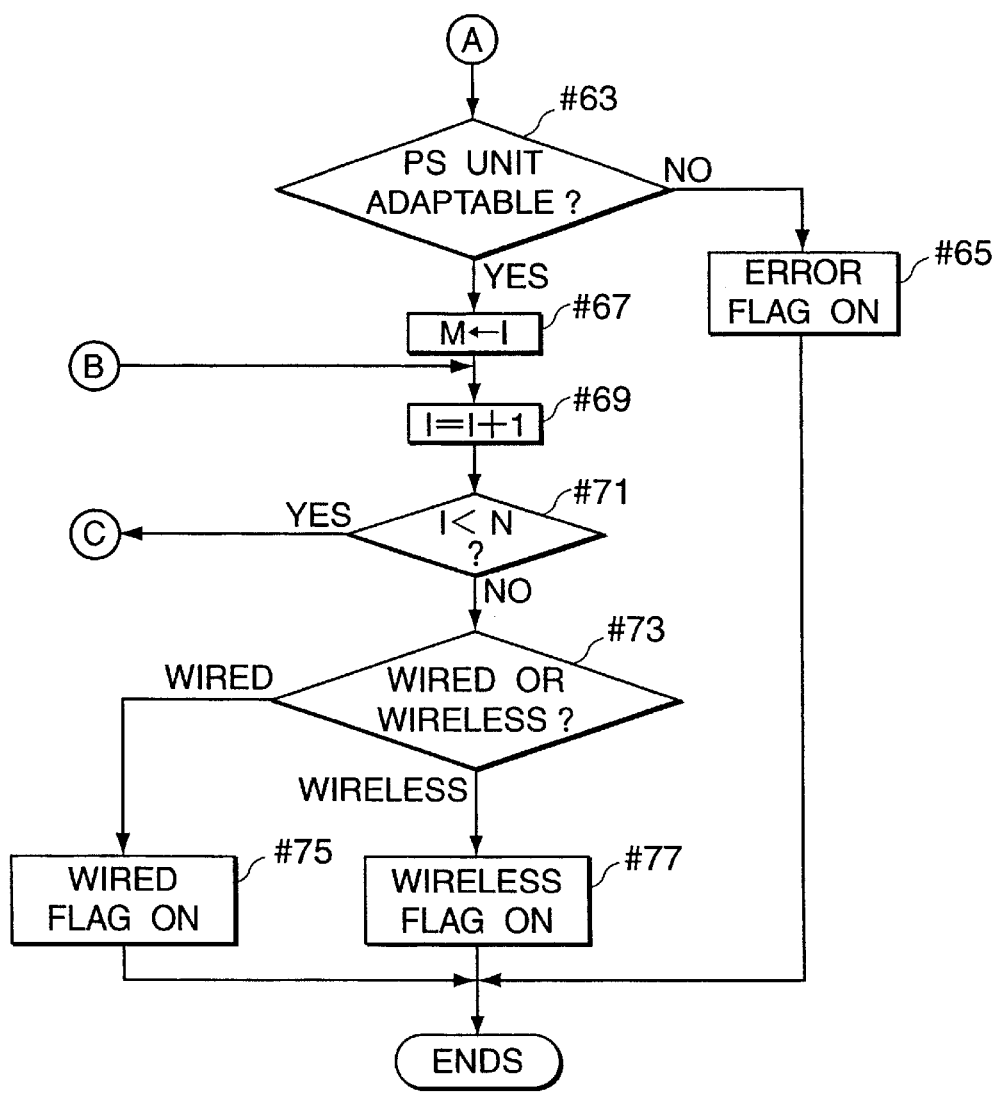
FIG. 17 is a flowchart showing the remainder of the flow shown in FIG. 16.

Subsequently, initial data communication such as registering of the discrimination number "M" of each light measuring unit 3 connected to the main unit 2 as the cascade line connection and confirming of the configuration of the multi-point light measuring system (wired system or wireless system) are executed (Step #13). Details of the initial data communication in the step #13 is shown in FIGS. 16 and 17.

When the initial data communication starts, a character string "CAL" is displayed on the display panel 21 (Step #41). The character string "CAL" designates that the initial data communication is executed in the multi-point light measuring system. Subsequently, an initial command, which is to be transmitted first for confirming the connection of the light measuring units 3 having the smallest discrimination number, is set (Step #43).

Specifically, the main unit controller 41 of the main unit 2 serially transmits a command including a data corresponding to a discrimination number "M" (M=0 to 29) of each light measuring units 3, and receives a response from the light measuring unit 3 having the same discrimination number "M". In this embodiment, the discrimination number "M" is serially increased one by one from 0 to 29, so that the command transmitted to each light measuring unit 3 includes data "I" corresponding to the discrimination number "M". As an initial value of the data "I", a numeral "0" is set (I=0).

When a first specific light measuring unit 3r having the discrimination number "R" is confirmed the connection, a data corresponding to the largest discrimination number "P" (P<R) among the discrimination numbers of the light measuring units 3 which are already confirmed the connection is memorized in the memory of the first specific light measuring unit 3r. By memorizing the data corresponding to "P", it is possible to number the discrimination numbers "M" discontinuous and to shorten the time necessary for the data communication in the multi-point light measuring system. A command for transmitting the measurement data from the light measuring units 3 to the main unit 2 serially in the order of the discrimination number "M" can be transmitted to all the light measuring unit 3 from the main unit controller 41 of the main unit 2 at once. When the light measuring unit controller 57 of the first specific light measuring unit 3r having the discrimination number "R" receives a response (data transmission) from a second specific light measuring unit 3p having the discrimination number "P", the light measuring unit controller 57 of the first specific light measuring unit 3r founds that the second specific light measuring unit 3p adjoining the first specific light measuring unit 3r has transmitted the response to the main unit 2 and it can stand by for transmitting own response to the main unit 2. By such a configuration, the main unit 2 can receive the responses from all the light measuring unit 3 serially without transmitting the command to each light measuring unit 3.

Each initial command transmitted for confirming the connection of each light measuring unit 3r includes not only the data "I" corresponding to the discrimination number thereof but also the data "J" corresponding to the discrimination number of the adjoining light measuring unit 3p. When an initial command is transmitted to the light measuring unit 3 having the smallest discrimination number, for example, "1", there is no discrimination number "P" of the adjoining light measuring unit 3p, so that an assumed discrimination number "P=Mmax+1" is set. In the step #43, initial values I=0 and J=Mmax+1 are set. The "Mmax" designates the largest value among the discrimination numbers "M".

In the above-mentioned description of the embodiment, the connection of the light measuring units 3 are confirmed in order of the discrimination number "M" in a direction increasing the value thereof from the smallest value to the largest value. Thus, the initial values (I, J) included in the initial command are set to be (00, 30). It, however, is possible to confirm the connection of the light measuring units 3 in order of the discrimination number in a direction decreasing the value thereof from the largest value to the smallest value.

Subsequently, the answer time lag "τ2" (for example 150 ms) for the wireless system is set as a threshold value "τr" which is used for judging whether the system is wired or wireless by the delay time "τ" of the response from the light measuring unit 3 (Step #45). Furthermore, a format of the command (see FIG. 12) is set (Step #47). In the format of the command, the data "I" corresponding to the discrimination number "M" of the light measuring unit 3 and the command number "52" designating the checking of the connection of light measuring units 3 (see table 1) are set at predetermined positions (Step #49). Furthermore, a value of the data "J" corresponding to the largest discrimination number "P"

among the discrimination numbers of the light measuring units already confirmed the connection is set at the position of the belonging data "D" in the format (Step #51). After that, the command is transmitted to all the light measuring units 3 (Step #53).

In each light measuring unit 3, the light measuring unit controller 57 extracts the data "I" corresponding to the discrimination number "M" of the objective light measuring unit and the data "J" corresponding to the discrimination number "P". The light measuring unit controller 57 further judges where the extracted discrimination number "M" coincides with the inherent discrimination number thereof memorized in the EEPROM 60. When the extracted discrimination number "M" coincides with the inherent discrimination number thereof, the light measuring unit controller 57 memorizes the discrimination number "P" of the adjoining light measuring unit into the RAM 573 (see FIG. 5) and transmits the data corresponding to the inherent discrimination number thereof to the main unit 2 as the answer. Alternatively, when the extracted discrimination number "M" does not coincide with the inherent discrimination number thereof, the light measuring unit controller 57 ignores the received command and transmits no response to the main unit 2.

In the main unit 2, the main unit controller 41 judges whether the data corresponding to the same discrimination number "M" as that in the transmitted command is received from the light measuring unit 3 or not (Step #55). When the main unit controller 41 receives no response from any light measuring unit 3 during a predetermined time period τ2 (NO in Step #55), the main unit controller 41 judges the discrimination number "M" is not used (no light measuring unit 3 having the discrimination number "M" exists) and it proceeds to Step #69. Alternatively, when the main unit controller 41 receives the response from the light measuring unit 3 during the predetermined time period "τ2" (YES in Step #55), the main unit controller 41 takes the answer time lag "τ" at the time when the answer is received (Step #57). Subsequently, the main unit controller 41 judges whether the answer time lag "τ" is longer than the answer time lag "τ1" (for example 50 ms) in the wired system or not (Step #59). When the answer time lag "τ" is equal to or smaller than the answer time lag "τ1" (τ≦τ1) (YES in Step #59), the main unit controller 41 changes the value of the threshold value "τr" is changed to the answer time lag "τ1" (Step #61). Alternatively, when the answer time lag "τ1" is larger than the answer time lag "τ1" (τ1<τ≦τ2) (NO in Step #59), the main unit controller 41 skips the step #61.

Subsequently, the main unit controller 41 judges the adaptability of the light measuring unit 3 which is confirmed the connection by the answer (Step #63). In the above-mentioned explanation of the embodiment, the light measuring units 3 are described as the same kind for constituting the illuminance meter. It, however, is possible to constitute another kind of light measuring apparatus such as a luminance meter and a color meter by using the same data communication system. In this case, since different kinds of light measuring units 3 is connectable in the same cascade line connection, it is necessary to judge whether the light measuring units 3 connected to the main unit 2 are regular or not. The main unit controller 41 executes this judgement in the step #63.

When the light measuring unit 3 is not adaptable (NO in Step #63), the main unit controller 41 sets an error flag on (Step #65) and returns to the main flow. Alternatively, when the light measuring unit 3 is adaptable (YES in Step #63), the main unit controller 41 registers the discrimination number "M" of the light measuring unit 3 into the RAM 413 (Step #67). Thus, when there is a response from the light measuring unit 3 having the discrimination number "00" responding to the initial command for confirming the connection of the light measuring units 3, the discrimination number "00" is registered into the RAM 413.

Subsequently, the main unit controller 41 increases the value of the data "I" by one (Step #69), and judges whether the value of the data "I" reaches to the maximum number "N" (N=30) of the light measuring units 3 connectable in the multi-point light measuring system or not (Step #71). When the value of the data "I" is smaller than the maximum number "N" (I<N) (YES in Step #71), the main unit controller 41 returns to the step #47 and repeats the steps #47 to #71 for confirming another light measuring unit 3 having the discrimination number "M+1".

When the connection of the light measuring unit is confirmed with respect to all the discrimination numbers (NO in Step #71), the main unit controller 41 judges whether the system is wired or wireless from the setting value of the threshold value "τr" (step #73). When the system is wired, that is τr=τ1, the main unit controller 41 sets a wired flag on (Step #75). Alternatively, when the system is wireless, that is τr=τ2, the main unit controller 41 sets a wireless flag on (#Step #77).

When the initial data communication flow shown in FIGS. 16 and 17 is completed, the main unit controller 41 judges whether the error flag is on or not (Step #15 in the main flow shown in FIG. 14). When at least one light measuring unit 3 is disadaptable and the error flag is on (YES in Step #15), the main unit controller 41 displays the character string "Err" on the display panel 21 (Step #17), and proceeds to sleep 3 mode. When the disadaptable light measuring unit is removed and the main switch 24 is switched on, the sleep 3 mode will be reset, and the main flow will be restarted from the box labeled "POW SW ON".

Alternatively, when all the light measuring units 3 are adaptable and the error flag is not on (NO in Step #15), the time counting of the timer B starts to count the time of 10 ms (Step #19). When the timer B counts 10 ms, the main unit controller 41 starts a check operation for judging whether any operation switch is operated or not (Step #21). Hereupon, when any operation switch is operated, the main unit controller 41 proceeds to the steps below #23. When no operation switch is operated, the timer B restarts the time count (Step #7). After passing 10 ms, the main unit controller 41 restarts the check operation, again (Step #21).

When any operation switch is operated, the main unit controller 41 judges whether the operation is switching off of the main switch 24 or not (Step #23). When the main switch 24 is switched off (YES in Step #23), the main unit controller 41 prepares to proceed a sleeping 1 mode (Step #37) and stores the data into the memory (Step #39). After that, the main unit controller 41 proceeds to sleep 1 mode for switching off the electric power.

When the main switch 24 is not switched off (NO in Step #23), the main unit controller 41 executes predetermined processes corresponding to the operated operation switches. For example, the light measuring unit 3 is specified by operations of the up operation switch 222d and the down operation switch 222e. The measurement mode of the specified light measuring unit 3 is instructed by the normal operation switch 221a. The main unit controller 41 sets the discrimination number "M" of the specified light measuring unit 3 and the command number 10 (see table 1) into the format of the command (see FIG. 12) and transmits the command to all the light measuring units 3 (Step #25).

When the light measuring unit controller 57 of the specified light measuring unit 3 having the discrimination number "M" receives the command transmitted from the main unit controller 41 of the main unit 2, the light measuring unit controller 57 controls the light measuring device 51, the switching circuit 52, the I/V converter 53, the response speed switching circuit 54, the buffer 55 and the A/D converter 56 so as to measure the illuminance. Furthermore, the light measuring unit controller 57 calculates the illuminance value "L", the relative illuminance value "Δ" or "Δ %", the summation illuminance value "Lsum", the average value "Lave", and so on, and transmits the calculated values to the main unit controller 41 of the main unit 2. When the main unit controller 41 receives the calculated values from the light measuring unit controller 57, the main unit controller 41 memorizes the calculated values into the RAM 413 and displays the calculated value (measurement result) on the display panel 21 responding to the instruction by the operation switches (Step #27).

Subsequently, the main unit controller 41 judges whether the contents of the display on the display panel 21 except the measurement result are demanded to be renewed or not by the instruction of the operation switch (Step #29). When the renewal of the contents of the display except the measurement result is demanded (YES in Step #29), the main unit controller 41 renews the contents of the display except the measurement result to the demanded contents (Step #31). Subsequently, the main unit controller 41 judges whether the measurement result displayed on the display panel 21 is demanded to be renewed or not (Step #33). When the rewriting of the measurement result is demanded (YES in Step #33), the main unit controller 41 renews the measurement result to the demanded contents (Step #35). When the renewal of the contents of display is not demanded (NO in Step #31) and when the renewal of the measurement result is not demanded (NO in Step #33), the main unit controller 41 maintains the display of the measurement result on the display panel 21 and proceeds to sleep 2 mode.

The main flow shown in FIGS. 14 and 15 corresponds to one light measuring process. Actually, the main flow is repeated at a predetermined interval, for example, 500 ms, and the measurement results are renewably displayed on the display panel 21. The sleep 2 mode is a process of the main unit controller 41 and the light measuring unit controller 57 for waiting the next light measuring process. When the light measuring unit 3 is set to be in the power saving mode, the electric power circuit 59a of the light measuring unit 3 is stopped so as to save the power loss during the sleep 2 mode.

Figure 18:
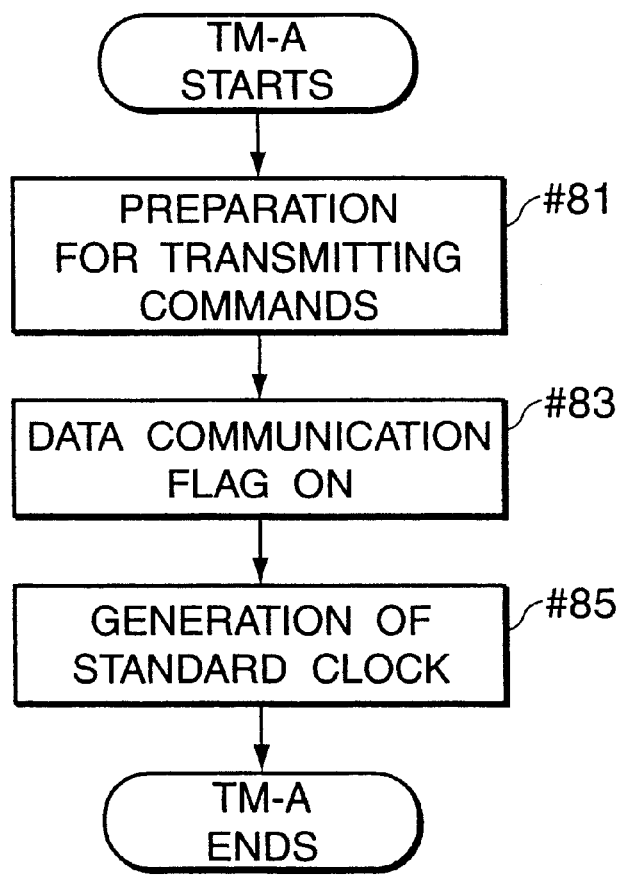
FIG. 18 is a flowchart showing an interrupt flow for executing a light measuring process at a predetermined interval in the multi-point light measuring system in the embodiment.

A flow for repeating the light measuring process at the interval of 500 ms is shown in FIG. 18. When a timer A (TM-A: not shown in the figure) counts the time period of 500 ms (500 ms has passed), the main unit controller 41 prepares to transmit the commands for measuring the illuminance by the light measuring units 3 again (Step #81), and sets a flag for showing that data has been communicated between the main unit 2 and the light measuring units 3 (Step #83). After that, another timer D (TM-D) starts to generate a standard clock for serial data communication having a predetermined frequency, for example, 19.2 kHz and the standard clock is inputted into the main unit controller 41 (Step #85). The standard clock is a synchronous signal for communicating the data by bit unit. The standard clock is generated only during the data communication and inputted into the main unit controller 41. The standard clock is used for communicating the data between the light measuring units 3 and the personal computer 9, too.

Figure 19:
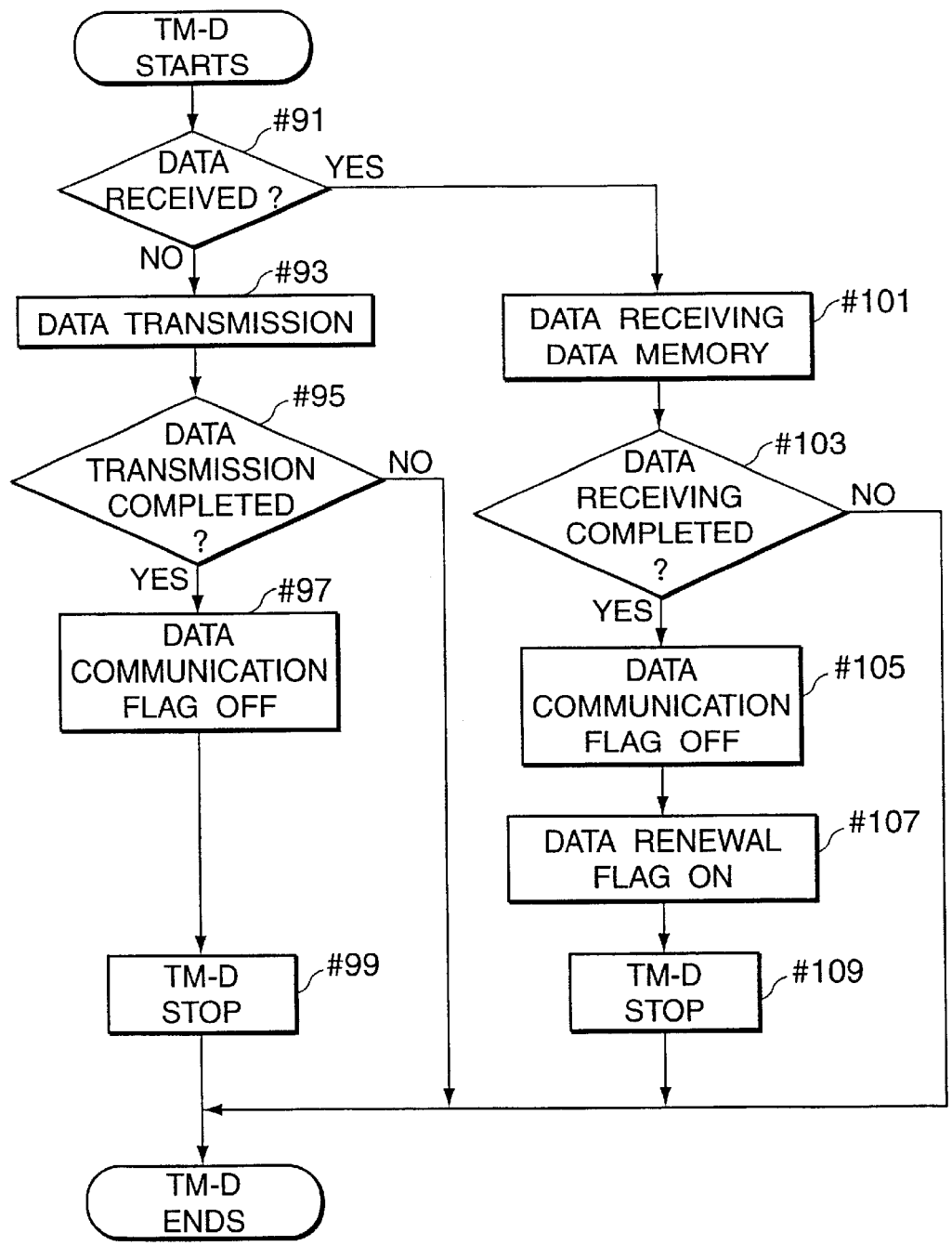
FIG. 19 is a flowchart showing a data communication flow using a standard clock in the multi-point light measuring system in the embodiment.

A data communication flow using the standard clock is shown in FIG. 19. When the timer D (TM-D) starts to generate the standard clock and puts into the main unit controller 41, the main unit controller 41 judges whether the data is received or not (Step #91). When the data is transmitted (NO in Step #91), the main unit controller 41 will transmit the binary data constituting the command (see FIG. 12) to the light measuring units 3 by one bit from the top of the data at an interval of 52.08 μs corresponding to the frequency of 19.2 kHz of the standard clock (Step #93). The main unit controller 41 judges whether transmission of all the binary data is completed or not (Step #95). When the data transmission is completed (YES in Step #95), the main unit controller 41 executes predetermined data transmission finishing process and resets the data communication flag off (Step #97). After that, the timer D stops the generation of the standard clock (Step #99).

When the data is received (YES in Step #91), the main unit controller 41 will receive the binary data corresponding to the response from the light measuring units 3 by one bit from the top of the data at an interval of 52.08 μs corresponding to the frequency of 19.2 kHz of the standard clock, and memorizes the binary data into a buffer memory (not shown in the figure) (Step #101). The main unit controller 41 judges whether the receiving of all the binary data is completed or not (Step #103). When the data receiving is completed (YES in Step #103), the main unit controller 41 executes predetermined data receiving finishing process and resets the data communication flag off (Step #105). Furthermore, the main unit controller 41 sets a data renewal flag on for demanding the rewriting of the contents of the display on the display memory 21 (Step #107).

After that, the timer D stops the generation of the standard clock (Step #109).

Figure 20:
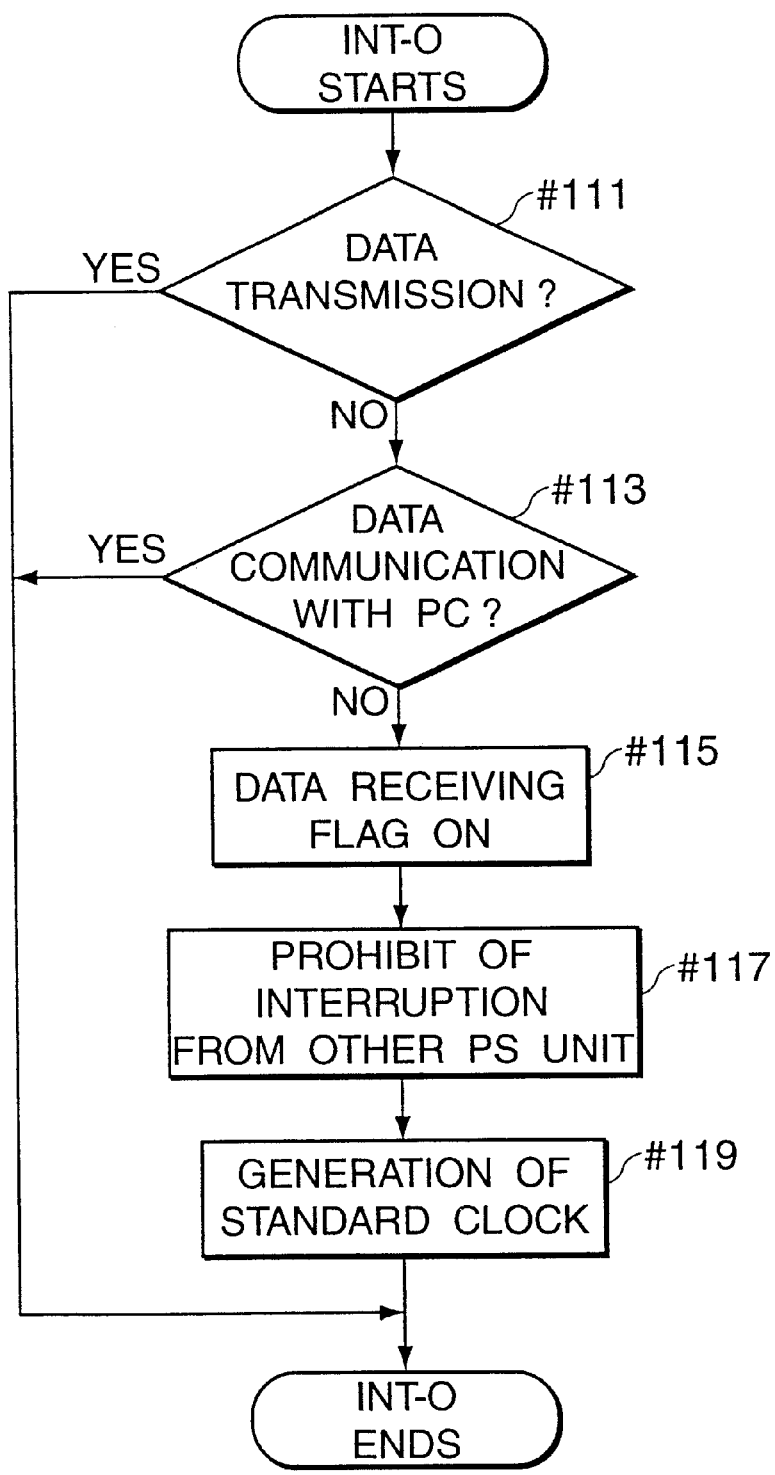
FIG. 20 is a flowchart showing an interrupt process in a main unit from any light measuring unit in the multi-point light measuring system in the embodiment.

An interrupt process in the main unit 2 with respect to the interruption from the light measuring units 3 is shown in FIG. 20. When a signal of interruption INT-0 is inputted from a specific light measuring unit 3i, the main unit controller 41 judges whether any data is transmitted to another light measuring unit 3, or any data is communicated between the main unit 2 and the personal computer 9 or not (Steps #111 and #113). When the main unit 2 is in the data communication (YES in Steps #111 or #113), the main unit controller 41 ends the interruption process for prohibiting the interruption INT-0. On the other hand, when the main unit does not transmit any data to the light measuring unit 3 or does not communicate any data with the personal computer 9 (NO in Steps #111 and #113), the main unit controller 41 set a data receiving flag on for showing data has been received (Step #115). The interruption from other light measuring units 3 will be prohibited (Step #117). After that, the timer D starts to generate the standard clock for receiving the data from the specific light measuring unit 3i (Step #119).

Figure 21:
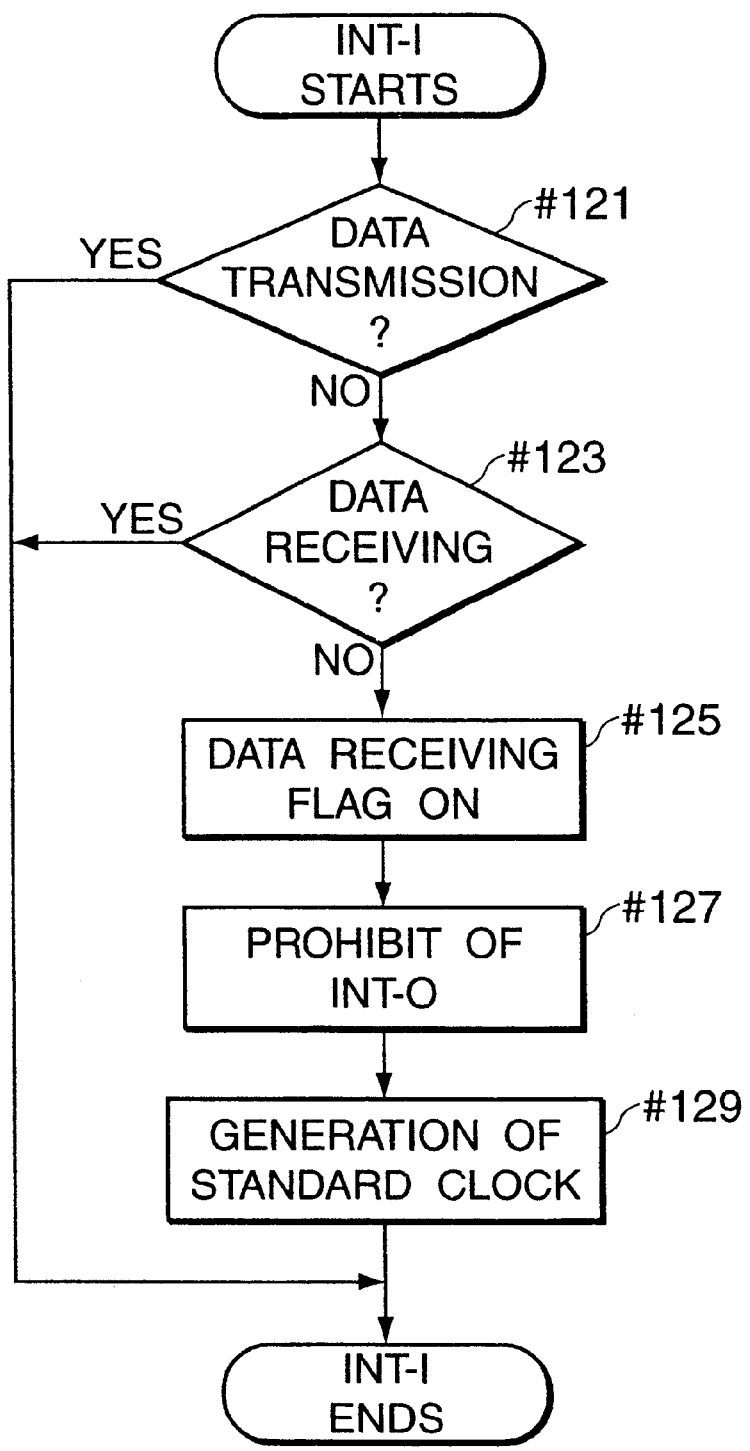
FIG. 21 is a flowchart showing an interruption process from a personal computer in the multi-point light measuring system in the embodiment.

An interruption process from the personal computer 9 into the main unit controller 41 of the main unit 2 for controlling the multi-point light measuring process by the personal computer 9 is shown in FIG. 21. When a signal of interruption INT-1 is inputted from the personal computer 9, the main unit controller 41 judges whether any data is transmitted to any light measuring unit 3, or any data is received from any light measuring unit 3 (interruption INT-0) or not (Steps #121 and #123). When the main unit 2 is in the data communication (YES in Steps #121 or #123), the main unit controller 41 ends the interruption process for prohibiting the interruption INT-1. On the other hand, when the main unit does not communicate any data with any light measuring unit 3 (NO in Steps #121 and #123), the main unit controller 41 set a data receiving flag on for showing data has been received from the personal computer 9 (Step #125). The interruption INT-0 from the light measuring unit 3 will be prohibited (Step #127). After that, the timer D starts to generate the standard clock for receiving the data from the personal computer 9 (Step #129).

When the multi-point light measuring process is controlled by the personal computer 9, the command 54 (see table 1) is transmitted to the main unit controller 41 of the main unit 2 from the personal computer 9 by the interruption INT-1 shown in FIG. 21. A common terminal of the switching portion 45 is turned to the data communication interface circuit 44 from the main unit controller 41 by the control of the main unit controller 41. By such a switching operation, the personal computer 9 is connected to the light measuring unit controller 57 of each light measuring unit 3 via the data communication interface 44 and the switching portion 45. The light measuring unit controller 57 executes the light measuring process by the command from the personal computer 9.

When the main unit controller 41 receives the command having the command number 54 from the personal computer 9, the main unit controller 41 switches the connection of the switching portion 45 and changes the contents of the display to a character string "PC" for showing the control by the personal computer 9. The protocol for controlling the multi-point light measuring process between the personal computer 9 and t he light measuring units 3 is substantially the same as that between the main unit 2 and the light measuring units 3. That is, the personal computer 9 communicates the command having the format shown in FIG. 12 between the light measuring units 3 for collecting the data. Furthermore, the personal computer 9 processes the data by following a predetermined program and displays the processed results in a predetermined format on the display apparatus 92.

Figure 22:
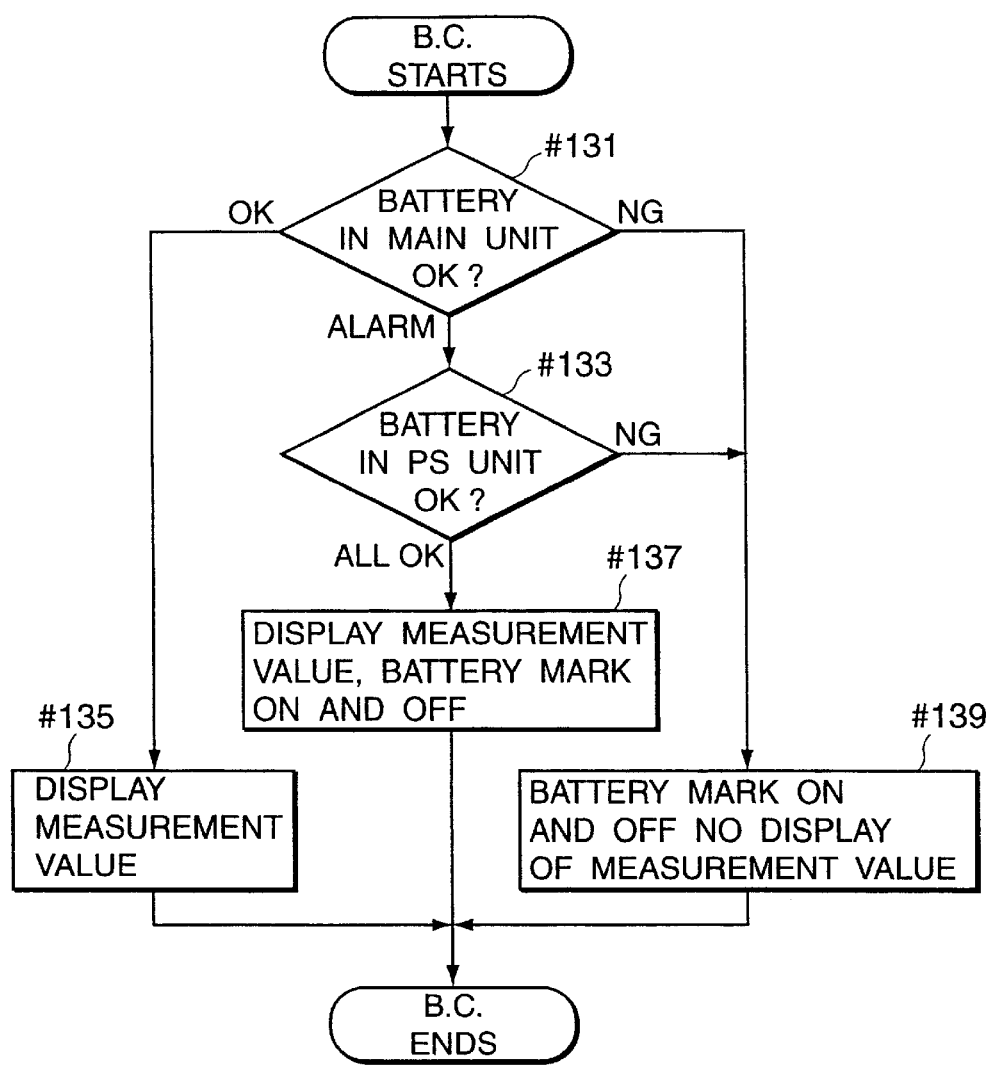
FIG. 22 is a flowchart showing a battery check process in the multi-point light measuring system in the embodiment.

A batter y check process in the multi-point light measuring system is described with reference to a flowchart shown in FIG. 22.

As mentioned above, the main unit 2 and the light measuring units 3 respectively have the electric power circuits 46 and 59a. The electric power circuits 46 and 59a are respectively checked by the battery checkers 47 and 59b. When the battery check (B.C.) process starts, the main unit controller 41 of the main unit 2 checks the condition of the electric power circuit 46 by using the battery checker 47 (Step #131). Subsequently, the main unit controller 41 checks the electric power circuit 59a of each light measuring unit 3 via the light measuring unit controller 57 (Step #133). A predetermined alarm mark corresponding to the result of the battery check is displayed on the display panel 21 (Steps #135 to #139).

When the electric power circuit 46 of the main unit 2 is normal (OK in Step #131), the main unit controller 41 normally displays the measurement result on the display panel 21 and the alarm mark such as a battery mark showing the abnormal of the battery is not displayed (Step #135). When t he electric power circuit 46 of the main unit 2 is abnormal (NG in Step #131), the main unit controller 41 displays only the battery mark on and off the display panel 21 (Step #139).

When the output of the electric power circuit 46 of the main unit 2 is in an alarm level (ALARM in Step #131), the main unit controller further checks the electric power circuit 59a of each light measuring unit 3 via the light measuring unit controller 57 (Step #133). When all the electric power circuits 59a of the light measuring units 3 are normal (ALL OK in Step #133), the main unit controller 41 displays the measurement result on the display panel 21 and the battery mark on and off the display panel 21 (Step #137). At this time, it is considered that the battery of the main unit 2 has been wasted, so that the battery mark is displayed on and off further to the display of the measurement value on the display panel 21 for demanding the change of the battery to the user.

When at least one of the electric power circuit 59a is abnormal (NG in Step #133), the main unit controller 41 displays only the battery mark on and off the display panel 21 (Step #139). That is, when an abnormal occurs in at least one of the electric power circuits 46 and 59s, only the battery mark is displayed on and off the display panel 21. Thus, the user can know the abnormality of the electric power circuits 46 and 59a by the battery marl, so that he can take a preferable action.

As mentioned above, a plurality of the light measuring units 3 can be connected to the same main unit 2 by using the main unit adapter 6, the light measuring unit adapter 7 and the communication cables 8 as the cascade line connection in the embodiment, the multi-point light measuring system can be configured more simple than the case that a plurality of the illuminance meters are connected as the cascade line connection. Especially, the light measuring unit 3 is detachable from the main unit 2, so that one set of illuminance meter 1, "N–1" number of light measuring units 3, one main unit adapter 6, "N" number of light measuring unit adapters 7 and "N" number of communication cables 8 can configure the multi-point light measuring system having "N" number of measurement points. As a result, the cost for constituting the multi-point light measuring system can be inexpensive.

Furthermore, the main unit 2 and at least one group of the light measuring units 3 which are connected as the cascade line connection can be communicated by wireless data communication system, so that it is possible to measure the optical characteristics such as the illuminance at remote positions or in the air. Furthermore, the complexity of the measurement system due to the wiring can be reduced by the wireless data communication, so that disconnection due to the stumble can be prevented.

Still furthermore, the personal computer 9 can externally be connected to the main unit 2, so that the multi-point light measuring system using the personal computer 9, in which the light measuring units 3 can be controlled by the command from the personal computer 9 via the main unit 2, is easily constituted. As a result, many measurement data obtained by the light measuring units 3 can be processed by using the data processing function and the displaying function of the personal computer 9 pluralistically.

Still furthermore, it is possible to configure the multi-point light measuring system by using combination of a plurality of light measuring units and a main unit which cannot constitute an independent light measuring apparatus. In this case, it is further possible to include different kind of the light measuring units, even when the data communication between the main unit and all light measuring units can be treated commonly.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A multi-point light measuring system comprising:

a plurality of light measuring units for receiving incident light and for obtaining light measuring data with respect to the incident light;

a single main unit including a controller for controlling light measuring operation and a display, wherein the main unit further includes a connector by which an external data processing apparatus is connected, and the light measuring data transmitted from the light measuring units are retransmitted to the external data processing apparatus via the connector;

a plurality of first interface units respectively provided on the light measuring units, in which adjoining two first interface units being connected by a communication cable; and a second interface unit provided on the main unit; wherein the controller of the main unit collects the light measuring data from at least one light measuring unit via the first and second interface units and the communication cable, and displays at least a value based on the collected data on the display.

2. The multi-point light measuring system in accordance with claim 1, wherein the controller calculates statistic values of the light measuring data obtained from a plurality of the light measuring units and displays at least one calculated value.

3. The multi-point light measuring system in accordance with claim 1, wherein the first interface unit is detachably coupled to each light measuring unit, and the second interface unit is detachably coupled to the main unit.

4. The multi-point light measuring system in accordance with claim 3, wherein a coupling portion of each light measuring unit can directly be coupled with a coupling portion of the main unit, and the light measuring unit and the main unit configures an independent light measuring apparatus when they are directly coupled.

5. The multi-point light measuring system in accordance with claim 1, wherein the first interface unit includes a device for setting a discrimination code of the light measuring unit to be connected thereto, and the controller communicates the data with the light measuring unit having the same discrimination code as the discrimination code to be controlled.

6. The multi-point light measuring system in accordance with claim 5, wherein the controller automatically counts the total number of the light measuring units which are connected to the main unit by confirming the discrimination codes set with respect to the light measuring units.

7. The multi-point light measuring system in accordance with claim 5, wherein the controller displays the light measuring data and the discrimination code of the light measuring unit by which the light measuring data are obtained on the display with a predetermined relation.

8. The multi-point light measuring system in accordance with claim 7, wherein the controller detects a largest value or a smallest value among the light measuring data collected from the light measuring units and the discrimination code of the light measuring unit by which the largest value or the smallest value is obtained, and displays the largest value or the smallest value and the discrimination code on the display.

9. The multi-point light measuring system in accordance with claim 5, wherein the controller calculates an average value of the light measuring data obtained by the light measuring units and displays the average value on the display.

10. The multi-point light measuring system in accordance with claim 1, wherein response speed for light measuring operation of each light measuring unit can be switched between a first speed and a second speed slower than the firs speed, and the controller can control the switching of the response speed of the light measuring units.

11. The multi-point light measuring system in accordance with claim 1, wherein each light measuring unit further includes a detector for detecting abnormality of electric power source, and the controller of the main unit obtains the data with respect to the abnormality of the electric power source detected by the detector and judges the abnormality of the electric power source.

12. The multi-point light measuring system in accordance with claim 11, wherein the main unit further includes an alarm for alarming the abnormality of the electric power source.

13. The multi-point light measuring system in accordance with claim 1, wherein the controller of the main unit displays a predetermined contents on the display for showing the external data processing apparatus is connected when the external data processing apparatus is connected to the connector.

14. A multi-point light measuring system comprising:

a plurality of light measuring units for receiving incident light and for obtaining light measuring data with respect to the incident light;

a single main unit including a controller for controlling light measuring operation and a display, wherein the main unit further includes a connector by which an external data processing apparatus is connected, and the light measuring data transmitted from the light measuring units are retransmitted to the external data processing apparatus via the connector;

a plurality of first interface units respectively provided on the light measuring units, in which adjoining two first interface units being connected by a communication cable;

a second interface unit provided on the main unit; and a pair of third interface units for wireless data communication provided between one of the first interface unit and the second interface unit; wherein the controller of the main unit collects the light measuring data from at least one light measuring unit via the first, second and third interface units and the communication cable, and displays at least a value based on the collected data on the display.

15. The multi-point light measuring system in accordance with claim 14, wherein the first interface unit is detachably coupled to each light measuring unit, and the second interface unit is detachably coupled to the main unit.

16. The multi-point light measuring system in accordance with claim 14, wherein the third interface units communicate the data by radio beam.

17. The multi-point light measuring system in accordance with claim 14, wherein the same data are transmitted at least twice in the data communication between the main unit and the light measuring units.

18. The multi-point light measuring system in accordance with claim 14, wherein the controller of the main unit judges whether the data communication between the first interface unit and the second interface unit is wireless or not by a delay of response from each light measuring unit.

19. The multi-point light measuring system in accordance with claim 14, wherein the controller of the main unit displays a predetermined contents on the display for showing the external data processing apparatus is connected when the external data processing apparatus is connected to the connector.

20. A light measuring apparatus used in a multi-point light measuring comprising:

a light measuring unit having a light measuring device for obtaining light measuring data with respect to an incident light; and an interface unit having a receiver for receiving a light measuring data from another light measuring apparatus and a transmitter for transmitting the light measuring data to an external apparatus; wherein the interface unit transmits not only the light measuring data obtained by the light measuring unit, but also the light measuring data transmitted from the other light measuring apparatus to the external apparatus via the transmitter.

21. The light measuring apparatus in accordance with claim 20, wherein the interface unit is detachably coupled with the light measuring unit.

* * * * *